United States Patent
Tsukada

(10) Patent No.: US 9,635,200 B2
(45) Date of Patent: Apr. 25, 2017

(54) IMAGE FORMING SYSTEM, IMAGE FORMING APPARATUS CAPABLE OF COMMUNICATING WITH A PORTABLE TERMINAL, PORTABLE TERMINAL CAPABLE OF COMMUNICATING WITH AN IMAGE FORMING APPARATUS, AND RECORDING MEDIUM

(71) Applicant: Konica Minolta, Inc., Chiyoda-ku, Tokyo (JP)

(72) Inventor: Koji Tsukada, Hamamatsu (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/645,100

(22) Filed: Mar. 11, 2015

(65) Prior Publication Data
US 2015/0264220 A1    Sep. 17, 2015

(30) Foreign Application Priority Data

Mar. 14, 2014    (JP) ................................. 2014-052688

(51) Int. Cl.
G06F 3/12    (2006.01)
H04N 1/00    (2006.01)
G06K 15/00    (2006.01)

(52) U.S. Cl.
CPC ..... H04N 1/00498 (2013.01); H04N 1/00514 (2013.01)

(58) Field of Classification Search
None
See application file for complete search history.

(56) References Cited

U.S. PATENT DOCUMENTS

| 2013/0167208 A1* | 6/2013 | Shi | H04L 63/18 726/5 |
| 2013/0229677 A1* | 9/2013 | Nuggehalli | G06F 3/1204 358/1.13 |
| 2014/0233060 A1* | 8/2014 | Anezaki | G06F 3/1258 358/1.15 |
| 2014/0376035 A1* | 12/2014 | Niimura | G06F 3/1203 358/1.15 |

FOREIGN PATENT DOCUMENTS

| JP | 05-122424 A | 5/1993 |
| JP | 2006-277239 A | 10/2006 |

* cited by examiner

*Primary Examiner* — Henok A Shiferaw
(74) *Attorney, Agent, or Firm* — Buchanan Ingersoll & Rooney PC

(57) ABSTRACT

An image forming system includes an image forming apparatus and a portable terminal for displaying a character input screen. The image forming apparatus has a generation part for generating a code image having a display command to display a character input part in the character input screen and a display part for displaying an operation screen including the code image. The external terminal has an image pickup part for generating a picked-up image obtained by picking up an image of the operation screen, an extraction part for extracting the display command from the code image included in the picked-up image, a user interface part for displaying, on the basis of the display command, the character input screen obtained by synthesizing the character input part and the picked-up image, and a communication part for transmitting a character input content inputted in the character input screen to the image forming apparatus.

16 Claims, 21 Drawing Sheets

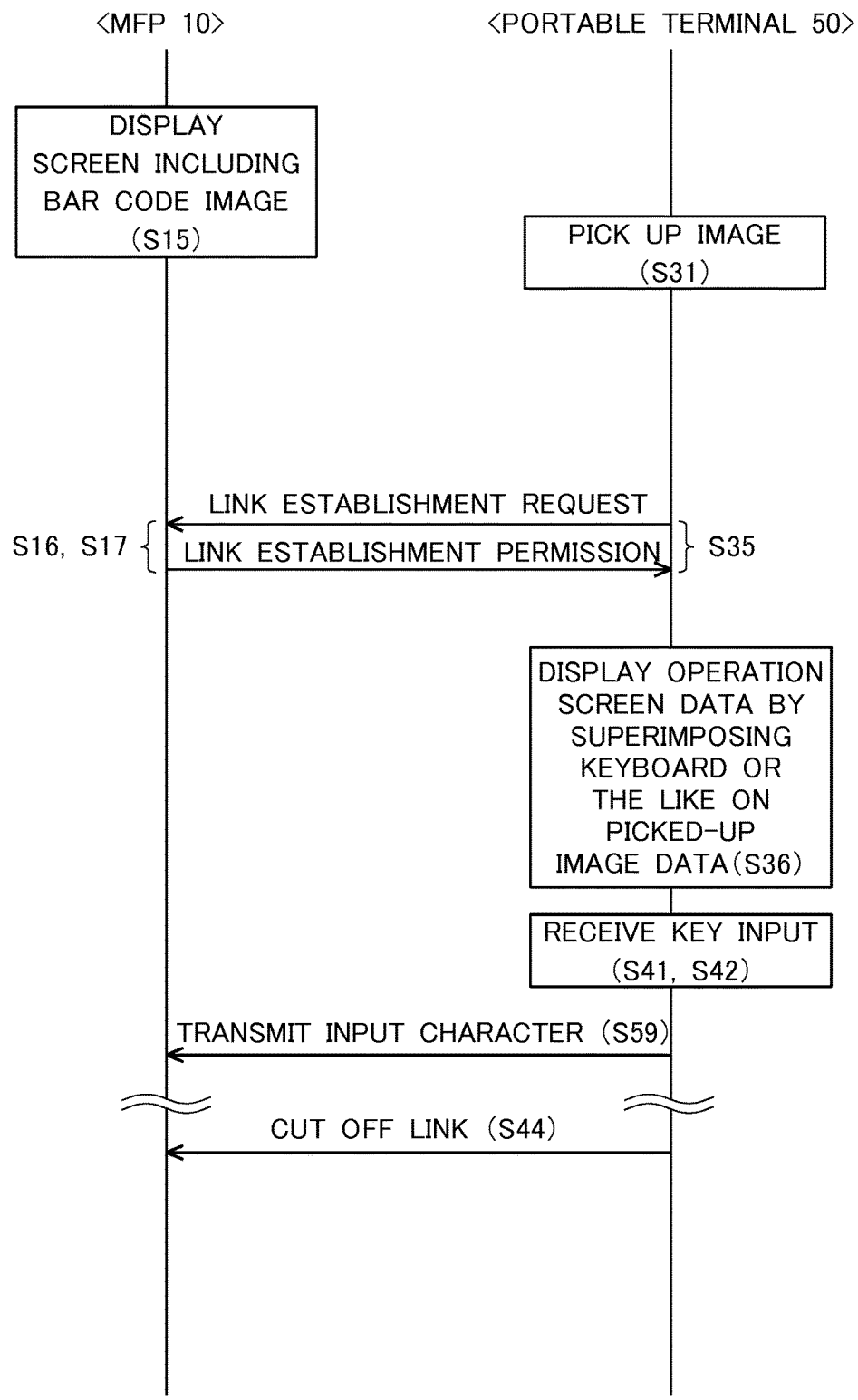

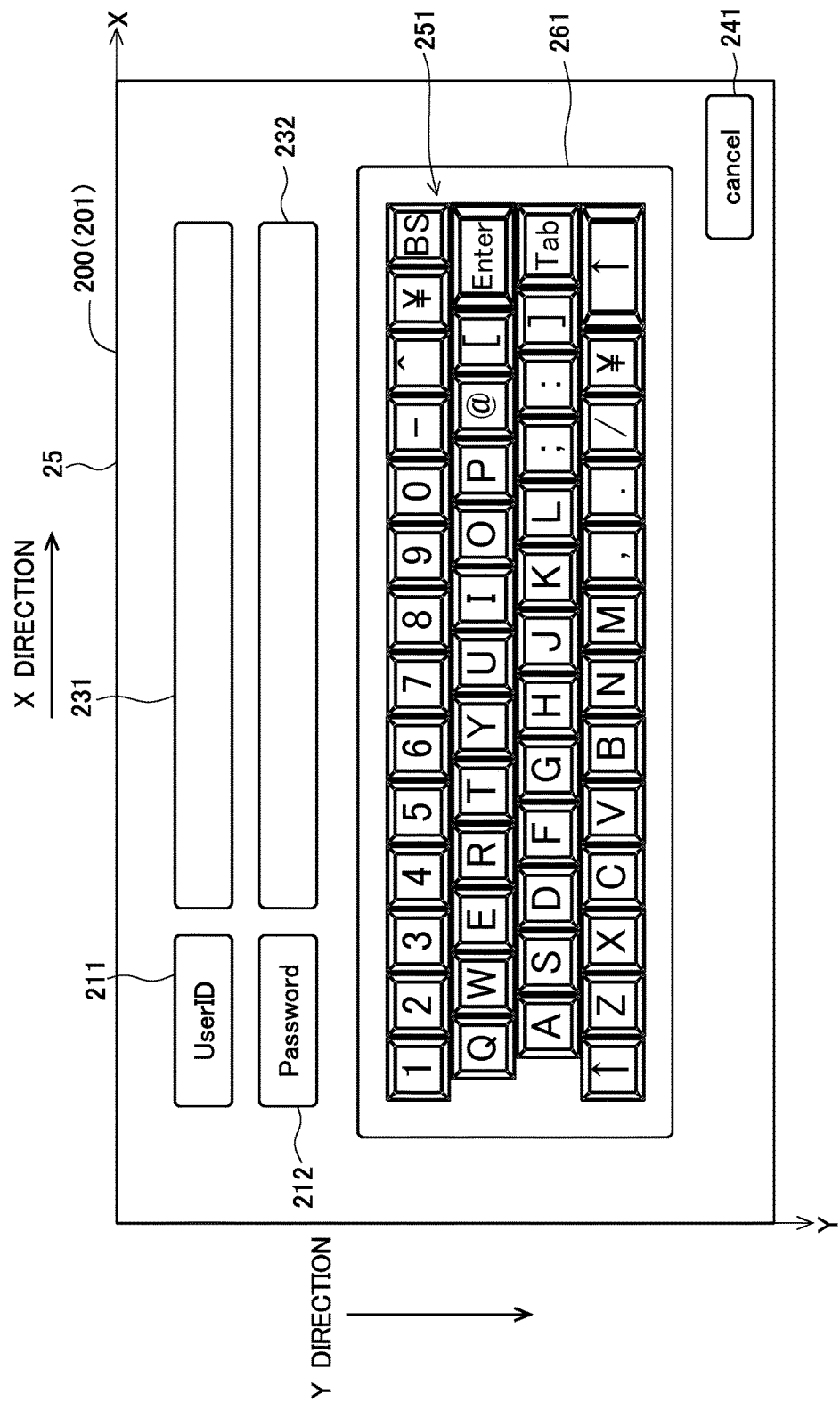

Fig. 10

| ITEM | POSITION(X) | POSITION(Y) | SIZE(X) | SIZE(Y) | OTHER INFORMATION |
|---|---|---|---|---|---|
| TWO-DIMENSIONAL BAR CODE | X1 | Y1 | W1 | H1 | |
| USER INTERFACE | X2 | Y2 | W2 | H2 | SPECIFICATION OF "KEYBOARD" |
| BUTTON 1 | X3 | Y3 | W3 | H3 | UserID |
| BUTTON 2 | X4 | Y4 | W4 | H4 | Password |
| BUTTON 3 | X5 | Y5 | W5 | H5 | Cancel |
| TEXT ENTRY BOX 1 | X6 | Y6 | W6 | H6 | 30 CHARACTERS |
| TEXT ENTRY BOX 2 | X7 | Y7 | W7 | H7 | 30 CHARACTERS |
| CHECK ID | | | | | Abcde12 |

262 → TWO-DIMENSIONAL BAR CODE
261 → USER INTERFACE
211 → BUTTON 1
212 → BUTTON 2
241 → BUTTON 3
231 → TEXT ENTRY BOX 1
232 → TEXT ENTRY BOX 2

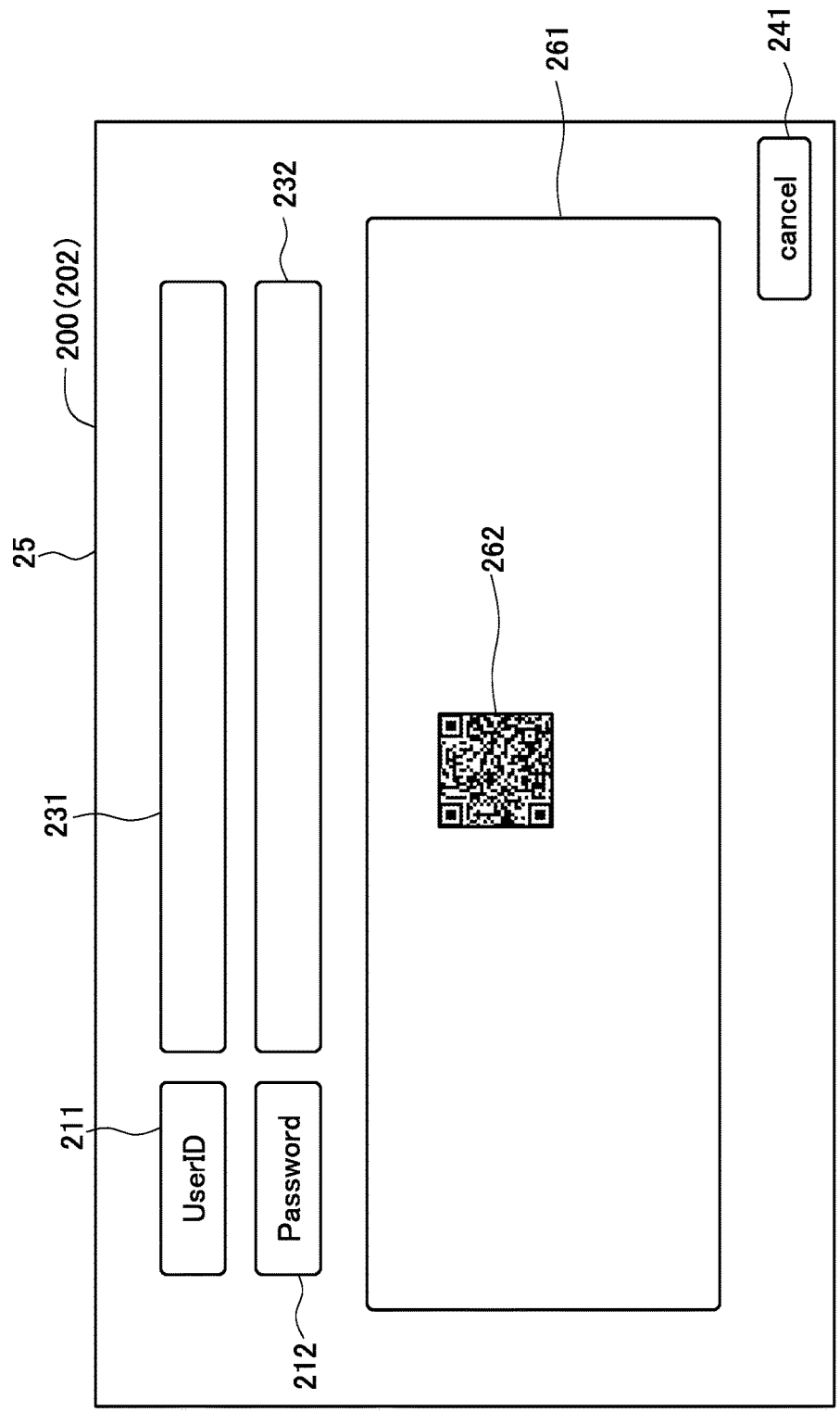

Fig.16

| | ITEM | POSITION(X) | POSITION(Y) | SIZE(X) | SIZE(Y) | OTHER INFORMATION |
|---|---|---|---|---|---|---|
| 262→ | TWO-DIMENSIONAL BAR CODE | x1 | y1 | w1 | h1 | |
| 261→ | USER INTERFACE | x2 | y2 | w2 | h2 | SPECIFICATION OF "KEYBOARD" |
| 211→ | BUTTON 1 | x3 | y3 | w3 | h3 | UserID |
| 212→ | BUTTON 2 | x4 | y4 | w4 | h4 | Password |
| 241→ | BUTTON 3 | x5 | y5 | w5 | h5 | Cancel |
| 231→ | TEXT ENTRY BOX 1 | x6 | y6 | w6 | h6 | 30 CHARACTERS |
| 232→ | TEXT ENTRY BOX 2 | x7 | y7 | w7 | h7 | 30 CHARACTERS |
| | CHECK ID | | | | | Abcde12 |

IMAGE FORMING SYSTEM, IMAGE FORMING APPARATUS CAPABLE OF COMMUNICATING WITH A PORTABLE TERMINAL, PORTABLE TERMINAL CAPABLE OF COMMUNICATING WITH AN IMAGE FORMING APPARATUS, AND RECORDING MEDIUM

This application is based on Japanese Patent Application No. 2014-052688 filed on Mar. 14, 2014, the contents of which are hereby incorporated by reference.

BACKGROUND OF THE INVENTION

Field of the Invention

The present invention relates to an image forming system comprising an image forming apparatus such as an MFP (Multi-Functional Peripheral) and its relevant technique.

Description of the Background Art

An MFP is provided with an operation panel for receiving various operation inputs. As the operation panel, generally, a panel which has relatively wide viewing angle in consideration of its operability.

When a user inputs characters to such an operation panel, however, there is a possibility that the content which the user of the MFP inputs is peeped by another person who stands next to the user.

Now, Japanese Patent Application Laid Open Gazette No. 2006-277239 (Patent Document 1) discloses an electronic document browsing technique for browsing an electronic document consisting of a plurality of blocks which have different confidentiality levels by a browsing device (computer or the like). In this technique, after a user authentication process is performed for the electronic document, blocks of low confidentiality level among the plurality of blocks in the electronic document are displayed on a fixed display of the browsing device in a normal state and those of high confidentiality level are displayed on the fixed display in a blank state. Further, a user wears a head mount display (hereinafter, referred to also as "HMD") and the contents of the blocks of high confidentiality level, which are displayed blank on the fixed display, are displayed at appropriate positions on a screen of the HMD. With this technique, it is possible to prevent a peep of information of high confidentiality level by another user, which is caused by that the information is displayed on the fixed display.

The technique of Patent Document 1 is, however, a technique for preventing an electronic document from being peeped by another user when the electronic document is displayed after the user authentication process (in short, a technique solely on a display of the electronic document). The technique of Patent Document 1 does not relate to an input process (character input process) of user authentication information and the like.

In Patent Document 1, shown is a normal login operation (where the user authentication information is inputted by using a user authentication dialog and a hardware keyboard of the browsing device (computer)). In such a login operation, there is a good possibility that an input operation performed by a user with the hardware keyboard of the browsing device (computer) and an input content may be peeped by another user (user who stands next, or the like). Further, in Patent Document 1, it is not supposed to use a different input method as the method of inputting the user authentication information (login information) and it is therefore difficult to avoid a peep of the input content of user authentication information by another user.

As another technique other than that of Patent Document 1, there is a technique that a panel display image of an image forming apparatus is sent to an external terminal other than the image forming apparatus and the MFP is remotely operated by using an operation screen displayed on the external terminal (for example, Japanese Patent Application Laid Open Gazette No. 05-122424 (Patent Document 2)).

Patent Document 2 discloses a technique in which operation screen data itself (bitmap image data or the like) is transmitted from the image forming apparatus to the external terminal to display the operation screen on a display part of the external terminal, and operation position information (press position information or the like) inside the operation screen is sent/received to thereby receive an operation input in the operation screen. This is a remote operation technique utilizing a so-called remote connection.

With such a technique, it is possible for a user to input the user authentication information or the like by using the operation screen displayed on the external terminal, which is other than an operation panel of the image forming apparatus. Therefore, it is possible to suppress a possibility that a character input content which is inputted by a user may be peeped by another user.

In the case, however, where a process of transmitting and receiving image data is performed in addition to a key input process, like in Patent Document 2, there arises a problem that the processing load of the external terminal increases to cause a decrease in the operability, such as a decrease in the rate of reaction to the operation.

SUMMARY OF THE INVENTION

It is an object of the present invention to provide a technique for avoiding a decrease in the operability with transmission and reception of image data while suppressing a possibility that a character input content in a character input process may be peeped by another user.

The present invention is intended for an image forming system. According to a first aspect of the present invention, the image forming system comprises an image forming apparatus and a portable terminal for displaying a character input screen to receive a character input from a user. In the image forming system of the first aspect of the present invention, the image forming apparatus has a generation part for generating a code image having a display command to display a character input part in the character input screen as code information thereof and a display part for displaying an operation screen including the code image, and the external terminal has an image pickup part for generating a picked-up image which is obtained by picking up an image of the operation screen of the image forming apparatus, an extraction part for extracting the display command of the character input part from the code image included in the picked-up image, a user interface part for displaying a screen which is obtained by synthesizing the character input part and the picked-up image as the character input screen, on the basis of the display command, and a communication part for transmitting a character input content inputted in the character input screen to the image forming apparatus.

The present invention is also intended for an image forming apparatus. According to a second aspect of the present invention, the image forming apparatus comprises a generation part for generating a code image having a display command to display a character input part in a character input screen displayed on the portable terminal, as code information thereof, a display part for displaying an operation screen including the code image, and a communication part for receiving a character input content inputted in the character input screen displayed on the portable terminal from the portable terminal by using a picked-up image which is obtained by picking up an image of the operation screen with the portable terminal.

The present invention is still also intended for a non-transitory computer-readable recording medium. According to a third aspect of the present invention, the non-transitory computer-readable recording medium records therein a computer program to be executed by a computer embedded in an image forming apparatus capable of communicating with a portable terminal, to cause the computer to perform the steps of a) generating a code image having a display command to display a character input part in a character input screen displayed on the portable terminal, as code information thereof, b) displaying an operation screen including the code image, and c) receiving a character input content inputted in the character input screen displayed on the portable terminal from the portable terminal by using a picked-up image which is obtained by picking up an image of the operation screen with the portable terminal.

The present invention is further intended for a portable terminal capable of communicating with an image forming apparatus. According to a fourth aspect of the present invention, the portable terminal comprises an image pickup part for generating a picked-up image by picking up an image of an operation screen displayed on the image forming apparatus, an extraction part for extracting a display command of a character input part from a code image included in the picked-up image, a user interface part for displaying a screen which is obtained by synthesizing the character input part and the picked-up image as a character input screen, on the basis of the display command, and a communication part for transmitting a character input content inputted in the character input screen to the image forming apparatus.

According to a fifth aspect of the present invention, a non-transitory computer-readable recording medium records therein a computer program to be executed by a computer embedded in a portable terminal capable of communicating with an image forming apparatus, to cause the computer to perform the steps of a) generating a picked-up image by picking up an image of an operation screen displayed on the image forming apparatus, b) extracting a display command of a character input part from a code image included in the picked-up image, c) displaying a screen which is obtained by synthesizing the character input part and the picked-up image as a character input screen, on the basis of the display command, and d) transmitting a character input content inputted in the character input screen to the image forming apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a timing chart showing an exemplary operation of the image forming system;

FIG. 9 is a view showing a login screen displayed on the MFP in a normal mode;

FIG. 10 is a view showing various information embedded in a code image;

FIG. 11 is a view showing a login screen displayed on the MFP in a high security mode and a picked-up image obtained by picking up an image of the login screen;

FIG. 16 is a view showing information acquired by using the code image;

DESCRIPTION OF THE PREFERRED EMBODIMENTS

Hereinafter, a preferred embodiment of the present invention will be described on the basis of Figures.

1. The First Preferred Embodiment 1-1. Overall Configuration

Figure 1:
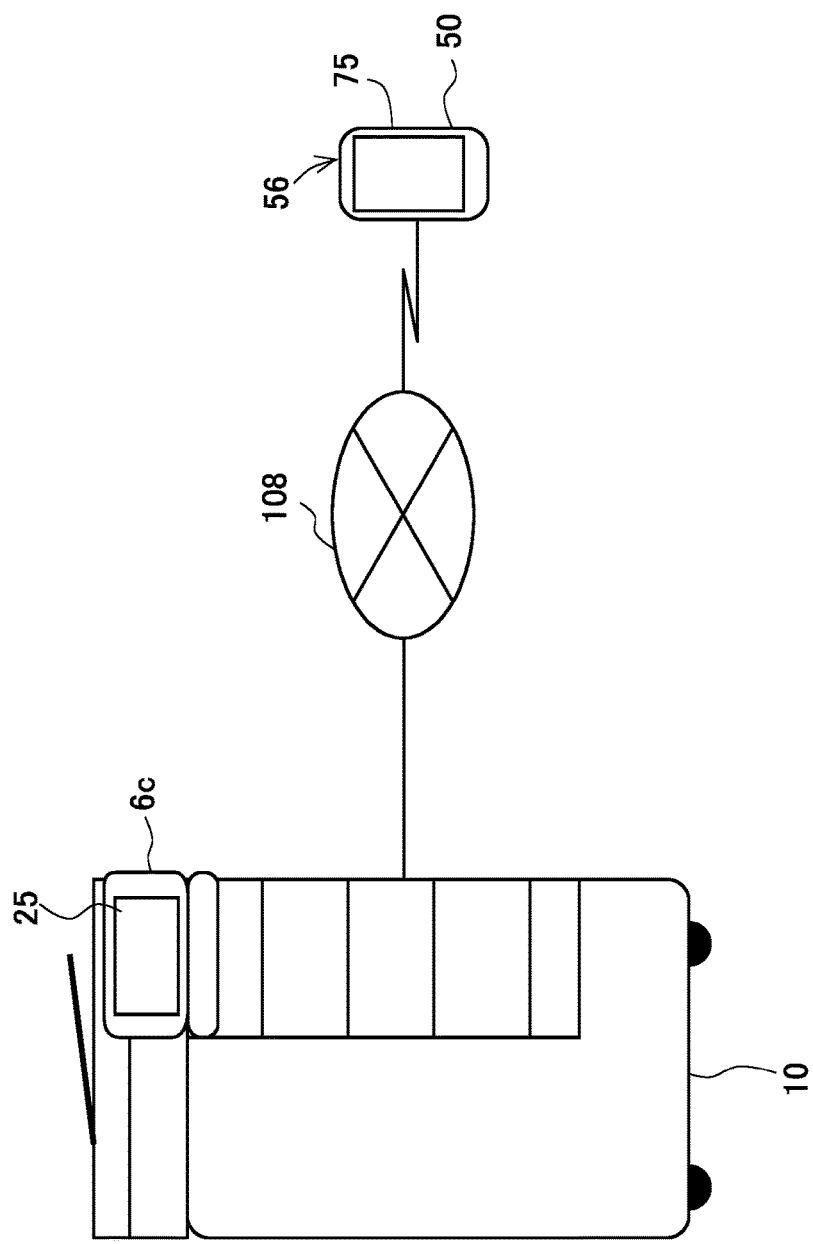
FIG. 1 is a schematic diagram showing an image forming system.

FIG. 1 is a view showing an image forming system 1 in accordance with the present invention. As shown in FIG. 1, the image forming system 1 comprises an image forming apparatus 10 and a portable terminal 50.

The image forming apparatus 10 and the portable terminal 50 are connected to each other via a network (communication network) 108. The network 108 includes a LAN (Local Area Network), the internet, and the like. The connection to the network 108 may be wired or wireless. There is a case, for example, where the image forming apparatus 10 is connected to the network 108 via wired communication and the portable terminal 50 is connected to the network 108 via wireless communication.

In the image forming system 1, various operations on the image forming apparatus 10 can be performed by using the portable terminal 50. In other words, the portable terminal 50 is capable of remotely operating the image forming apparatus 10. Further, the image forming system 1 is also referred to as a remote operation (remote control) system for remotely operating the image forming apparatus 10. Furthermore, the portable terminal 50 is also referred to as a remote operation (remote control) device of the image forming apparatus 10.

1-2. Constitution of Image Forming Apparatus

Figure 2:
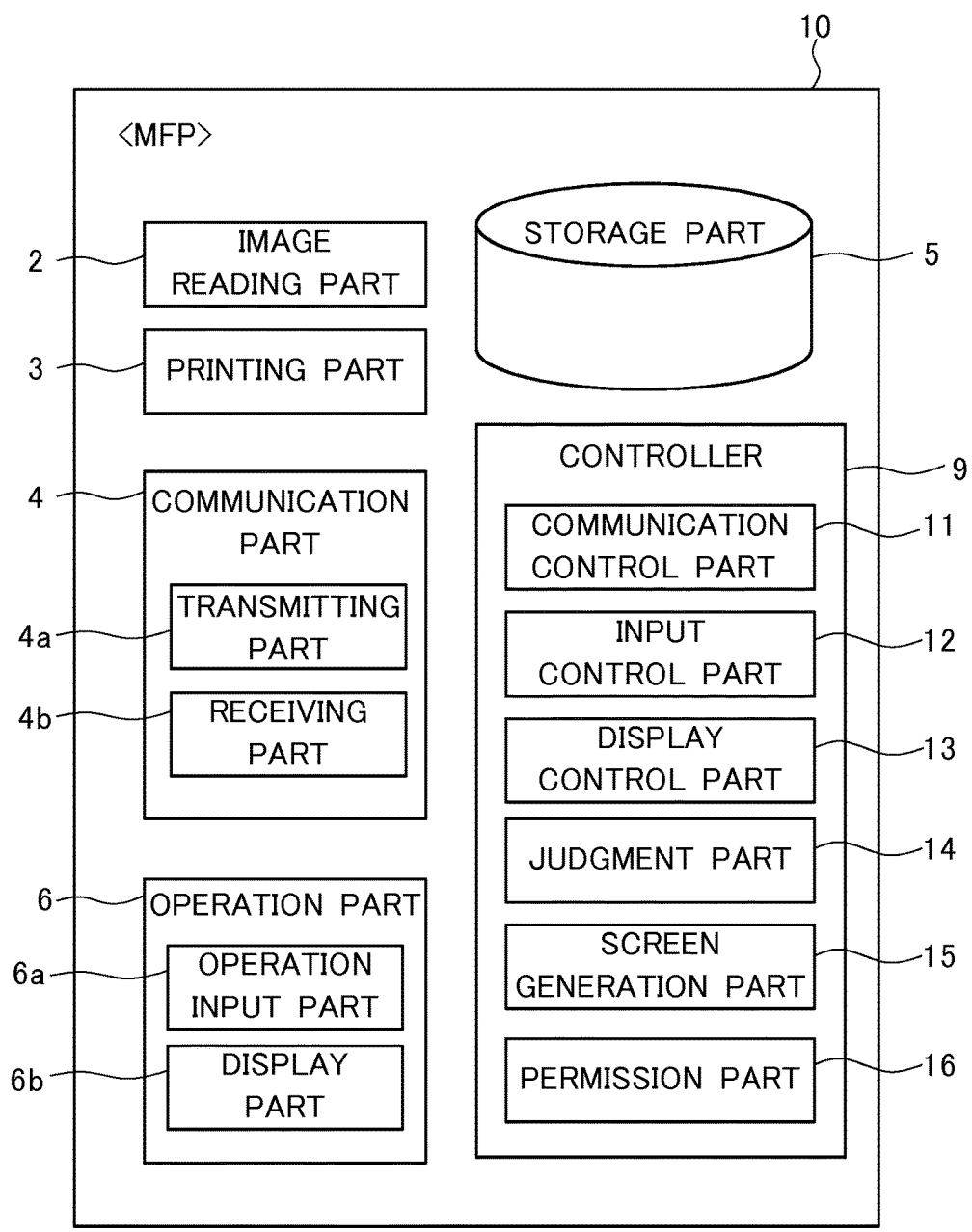
FIG. 2 is a view showing function blocks of an image forming apparatus.

FIG. 2 is a view showing function blocks of the image forming apparatus 10. Herein, as an example of the image forming apparatus 10, shown is an MFP (Multi-Functional Peripheral). FIG. 2 shows function blocks of an MFP 10.

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an operation part 6, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network 108. The network communication uses various protocols such as TCP/IP (Transmission Control Protocol/Internet Protocol) and the like. By using the network communication, the MFP 10 can transmit and receive various data to/from desired partners (for example, the portable terminal 50). The communication part 4 has a transmitting part 4a for transmitting various data and a receiving part 4b for receiving various data.

The storage part 5 is a storage unit such as a hard disk drive (HDD) or/and the like. The storage part 5 stores therein image data and the like of each operation screen. Further, the storage part 5 is provided with a plurality of boxes (folders) for users, respectively, and electronic document data (document file) and the like are stored in each box.

The operation part 6 comprises an operation input part 6a for receiving an operation input which is given to the MFP 10 and a display part 6b for displaying various information thereon.

The MFP 10 is provided with a substantially plate-like operation panel part 6c (see FIG. 1). The operation panel part 6c has a touch screen 25 (see FIG. 1) on a front surface side thereof. The touch screen 25 serves as part of the operation input part 6a and also serves as part of the display part 6b. The touch panel 25 is a liquid crystal display panel in which various sensors or the like are embedded, and capable of displaying various information thereon and receiving various operation inputs from an operator.

On the touch screen 25, for example, displayed are various operation screens (a login screen, a menu screen, and the like) (including button images and the like). By pressing buttons which are virtually arranged in the operation screen on the touch screen 25 (which are represented by the button images), the operator can set various operations of the MFP 10.

On a touch screen 75 of the portable terminal 50 (see FIG. 1), displayed are the same screens as the operation screens displayed on the touch panel 25 of the MFP 10. By using the operation screen displayed on the touch panel 75 of the portable terminal 50, the same operation as the operation performed by using the operation screen displayed on the touch panel 25 of the MFP 10 can be achieved. As described later, an operation screen for inputting some of information (for example, information on security) is displayed on the touch panel 75 of the portable terminal 50 by using a picked-up image or the like, which is taken by an image pickup part of the portable terminal 50.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, referred to simply as program) stored in the ROM (e.g., EEPROM), to thereby implement various processing parts. Further, the program (in more detail, a group of program modules) may be acquired via various portable (in other words, non-transitory) computer-readable recording media such as a USB memory or the like or via the network 108 or the like and installed into the MFP 10.

Specifically, as shown in FIG. 2, the controller 9 executes the program, to thereby implement various processing parts including a communication control part 11, an input control part 12, a display control part 13, a judgment part 14, a screen generation part 15, and a permission part 16.

The communication control part 11 is a processing part for controlling communication with other apparatus(es) (the portable terminal 50 or/and the like) in cooperation with the communication part 4 and the like. For example, the communication control part 11 receives operation input information which is information on an operation input from the operator to an operation screen 500 displayed on the portable terminal 50 (see FIG. 14), from the portable terminal 50.

The input control part 12 is a control part for controlling an operation input to the operation input part 6a (touch panel 25 or the like). For example, the input control part 12 controls an operation for receiving an operation input to an operation screen displayed on the touch panel 25.

The display control part 13 is a processing part for controlling a display operation on the display part 6b (touch panel 25 or the like). The display control part 13 displays, for example, an operation screen (remote operation screen) 200 (see FIGS. 9 and 11, and the like) for operating the MFP 10 on the touch panel 25.

The judgment part 14 is a control part for determining and controlling a screen transition content on an operation screen, and is also referred to as a screen transition control part. For example, the judgment part 14 determines a content of operation input in the portable terminal 50 on the basis of the operation input information (coordinate values of an operation input position and/or character code or the like) transmitted from the portable terminal 50 and also determines a screen of transition target, or the like, on the basis of the content of the operation input.

The screen generation part 15 generates an operation screen on the touch panel 25 of the MFP 10. For example, the screen generation part 15 generates an operation screen (including a two-dimensional bar code image 262 or the like) 200 (see FIG. 11) for inputting information relevant to security in a high security mode (described later). The operation screen 200 is imaged by the portable terminal 50, and a picked-up image 500 which is generated by an image pickup process in the portable terminal 50 is used for a character input operation in the portable terminal 50.

The permission part 16 is a processing part for determining whether to permit establishment of a communication link between the MFP 10 and the portable terminal 50.

1-3. Constitution of Portable Terminal

Next, description will be made on a constitution of the portable terminal (referred to also as the "remote operation device") 50.

The portable terminal 50 is a portable information input/output terminal device capable of performing network communication with other devices. Herein, as an example of the portable terminal 50, shown is a smartphone. The portable terminal 50, however, is not limited to this but may be a tablet terminal, or the like.

Figure 3:
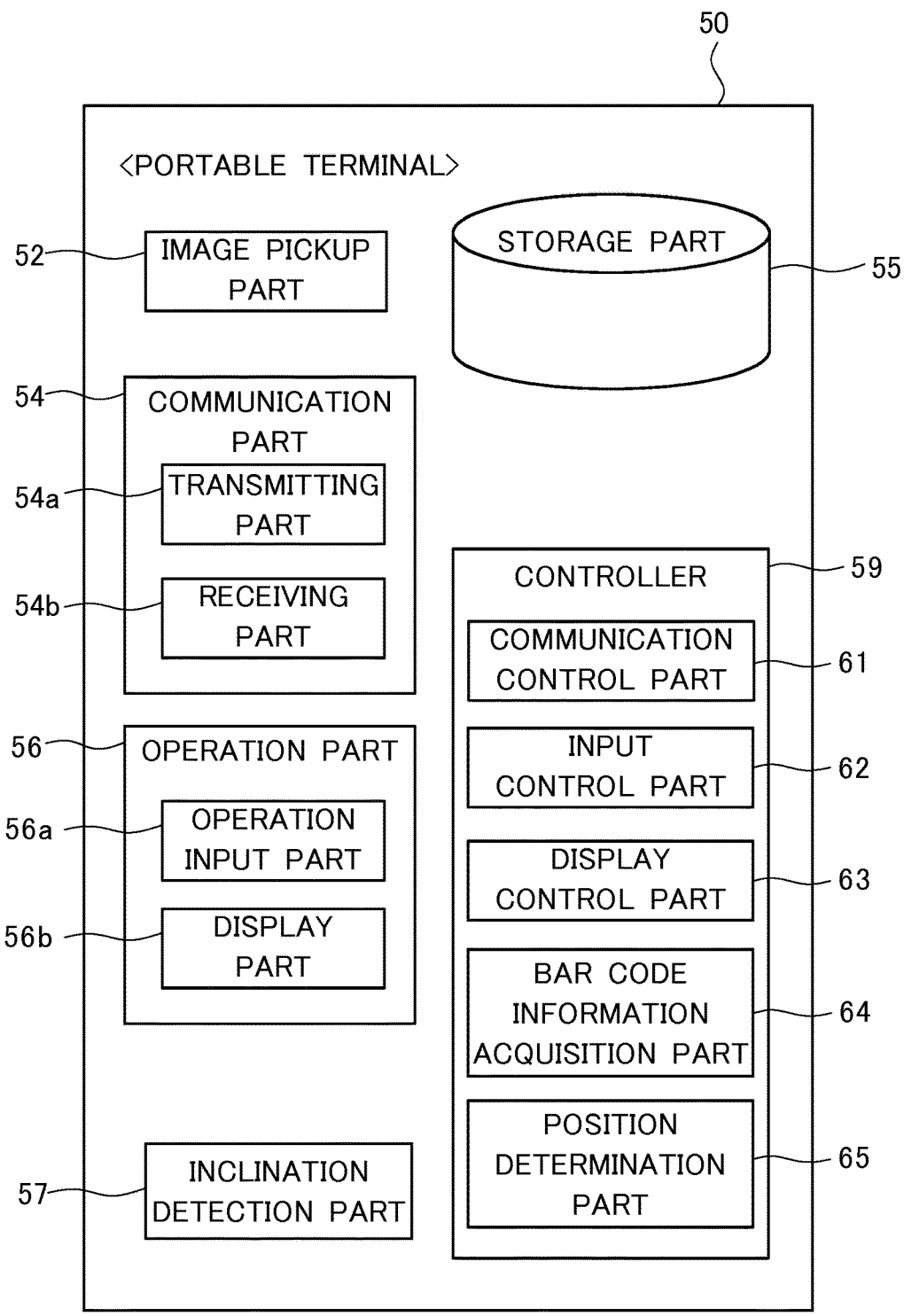
FIG. 3 is a functional block diagram showing a schematic constitution of a portable terminal.

FIG. 3 is a functional block diagram showing a schematic constitution of the portable terminal 50.

As shown in the functional block diagram of FIG. 3, the portable terminal 50 comprises an image pickup part 52, a communication part 54, a storage part 55, an operation part 56, an inclination detection part 57, a controller 59, and the like and multiply uses these constituent parts to implement various functions.

The image pickup part 52 comprises an image pickup element (CCD image pickup sensor or the like) and is a processing part of picking up an image of a subject. For example, the image pickup part 52 generates a picked-up image 500 (see FIG. 14) obtained by picking up an image of the operation screen 200 (FIG. 11) displayed on the touch panel 25 of the MFP 10.

The communication part 54 is capable of performing network communication via the network 108. The network communication uses various protocols such as TCP/IP (Transmission Control Protocol/Internet Protocol) and the like. By using the network communication, the portable terminal 50 can transmit and receive various data to/from desired partners (the MFP 10 or/and the like). The communication part 54 has a transmitting part 54a for transmitting various data and a receiving part 54b for receiving various data. For example, the transmitting part 54a transmits information of operation input to the operation screen 500 displayed on the touch panel 75 (information of input character or the like) to the MFP 10.

The storage part 55 is a storage unit such as a nonvolatile semiconductor memory or the like and stores various information.

The operation part 56 comprises an operation input part 56a for receiving an operation input which is given to the portable terminal 50 and a display part 56b for displaying various information thereon. The portable terminal 50 is provided with a touch panel 75 (see FIG. 1) which is a liquid crystal display panel in which various sensors or the like are embedded. Specifically, as shown in FIG. 1, on a front surface side of the substantially plate-like portable terminal 50, the touch panel 75 is provided almost entirely except its peripheral portion (frame portion). The touch panel 75 serves as a user interface part. In other words, the touch panel 75 serves as part of the operation input part 56a and also serves as part of the display part 56b.

The inclination detection part 57 comprises a gyro sensor or the like, and detects an inclination of the portable terminal 50 (especially, an orientation (vertical orientation and horizontal orientation) of the portable terminal 50).

On the touch screen 75, the same screen as the operation screen displayed on the touch panel 25 or an operation screen or the like using the picked-up image obtained by picking up an image in the image pickup part 52 of the portable terminal 50 is displayed as a remote operation screen (screen for remotely operating the MFP 10). Further, the touch panel 75 receives a touch gesture operation (referred to also as a touch operation) to the remote operation screen or the like.

The controller 59 shown in FIG. 3 is a control unit for generally controlling the portable terminal 50. The controller 59 is a computer system which is embedded in the portable terminal 50 and comprises a CPU, various semiconductor memories (RAM and ROM), and the like. The controller 59 causes the CPU to execute a predetermined software program (program) stored in a memory part (such as a semiconductor memory), to thereby implement various processing parts. Further, the program (in more detail, a group of program modules) may be acquired via various portable (in other words, non-transitory) computer-readable recording media such as a USB memory or the like or via the network 108 or the like and installed into the portable terminal 50.

A program for remote operation is installed in the portable terminal 50. The program is an application software program for remote operation of the MFP 10 and used for implementing various functions and the like relevant to the remote operation.

Specifically, the controller 59 executes the program, to thereby implement various processing parts including a communication control part 61, an input control part 62, a display control part 63, a bar code information acquisition part 64, and position determination part 65.

The communication control part 61 is a processing part for controlling a communication with the MFP 10 and the like in cooperation with the communication part 54 and the like. For example, the communication control part 61 transmits operation input information (information of operation input to the operation screen displayed on the touch panel 75 from the operator) to the MFP 10.

The input control part 62 is a control part for controlling an operation input to the operation input part 56a (touch panel 75 or the like). For example, the input control part 62 controls an operation for receiving a touch operation input (including a character input) to the remote operation screen (character input screen or the like) displayed on the touch panel 75.

The display control part 63 is a processing part for controlling a display operation on the display part 56b (the touch panel 75 and the like). For example, the display control part 63 displays the picked-up image 500 as the operation screen (character input screen or the like) for remotely operating the MFP 10, on the touch panel 75.

Further, the input control part 62 and the display control part 63 are each referred to also as a user interface control part.

The bar code information acquisition part 64 is a processing part for recognizing a two-dimensional bar code image (referred to also as a bar code image or a code image) 262 included in the picked-up image 500 and extracting and acquiring information included in the bar code image 262. For example, the bar code information acquisition part 64 extracts and acquires a display command of a character input part from the bar code image 262 included in the picked-up image 500. Further, the bar code information acquisition part 64 also extracts and acquires information on position and size of the bar code image 262 in the picked-up image 500, and the like, from the picked-up image 500.

The position determination part 65 is a processing part for specifying a corresponding position in the picked-up image 500 to each part (a character input parts display frame 261, character input fields 231 and 232, or the like) displayed on the touch panel 25 (the operation screen 200) and determining a display position of each part in the picked-up image 500, or the like. The position determination part 65 specifies the corresponding position in the picked-up image to each part by performing a coordinate conversion process on the basis of the information on the position and size of the bar code image 262 in the picked-up image 500 and the information on the position and size of the bar code image 262 in the operation screen 200.

1-4. Operation Mode

The MFP 10 has a plurality of modes including a normal mode and a high security mode as an operation mode relevant to security. The high security mode is a mode which ensures security higher than that of the normal mode.

In the normal mode, the operation screen is displayed on the touch panel 25 of the MFP 10, and the image data of the operation screen is transmitted from the MFP 10 to the portable terminal 50 and the same operation screen (remote operation screen) as the operation screen on the touch panel 25 is thereby displayed on the touch panel 75 of the portable terminal 50. The operation screen displayed on the touch panel 75 is the same screen as the operation screen displayed on the touch panel 25 in appearance. Then, when a pressing operation (touch operation) is performed onto the operation screen of the touch panel 75, position information (coordinate information or the like) of the operation position (referred to also as a press position or a touch position) is transmitted to the MFP 10. The MFP 10 recognizes an operation instruction of the user on the basis of the received position information and determines an operation screen to be displayed next. After that, the same operation is repeatedly performed, to thereby achieve the remote operation of the MFP 10 by the portable terminal 50.

In the high security mode, the same operation as the above-described operation in the normal mode is performed on the operation screens other than some of a plurality of operation screens. On the other hand, on some of the operation screens, an operation different from the above-described operation in the normal mode is performed. Specifically, on some of the operation screens which require high security (e.g., an input screen for authentication information (login screen) or the like), a character input part (keyboard or the like) which is displayed in the normal mode is not displayed on the touch panel 25. On some of the operation screens, the bar code image (in more detail, the two-dimensional bar code image) 262, instead of the character input part, is displayed on the touch panel 25 (see FIG. 11). In the bar code image 262, a display command of the character input part is embedded (included) as its code information. The portable terminal 50 generates a picked-up image 500 (see FIG. 14) which is obtained by picking up an image of the operation screen 200 (in more detail, all or some thereof) in the image pickup part 52. Then, the portable terminal 50 extracts the display command included in the bar code image 262 in the picked-up image 500 from the bar code image 262. Further, on the basis of the extracted display command, the portable terminal 50 displays a screen obtained by synthesizing the character input part (herein, the keyboard) 273 and the picked-up image 500 on the touch panel 75 as the character input screen (see FIG. 17). A user of the portable terminal 50 uses the character input part 273 displayed on the touch panel 75 to input characters. Receiving the character input from the user, the portable terminal 50 transmits the character input content (information on inputted characters) to the MFP 10 via the network.

Hereinafter, with reference to FIGS. 4 to 8 and the like, more detailed description will be made on the operation of the image forming system 1, centering on the above-described operation (especially, the operation in the high security mode).

1-5. Operation

Figure 4:
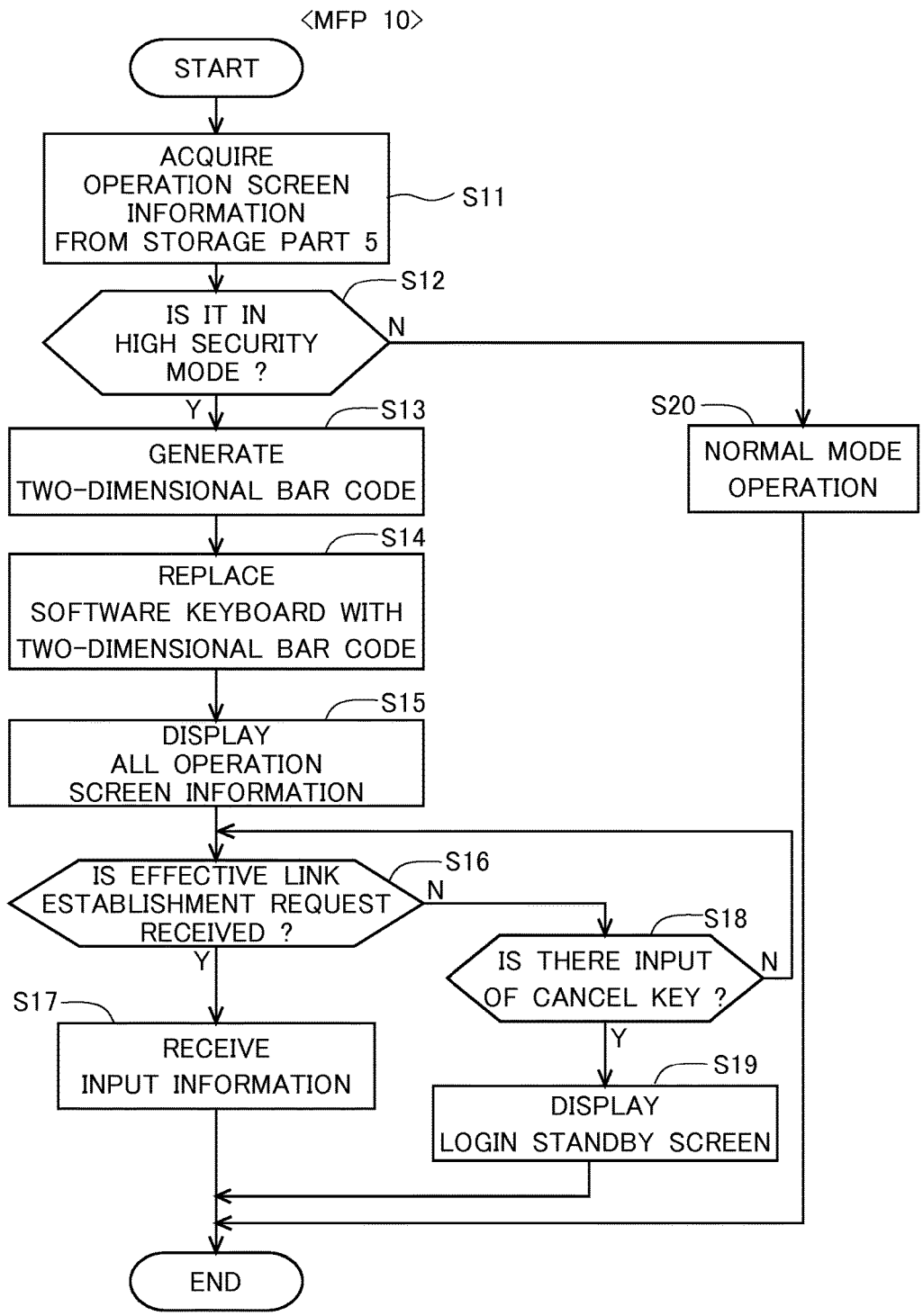
FIG. 4 is a flowchart showing an operation of an MFP.
Figure 5:
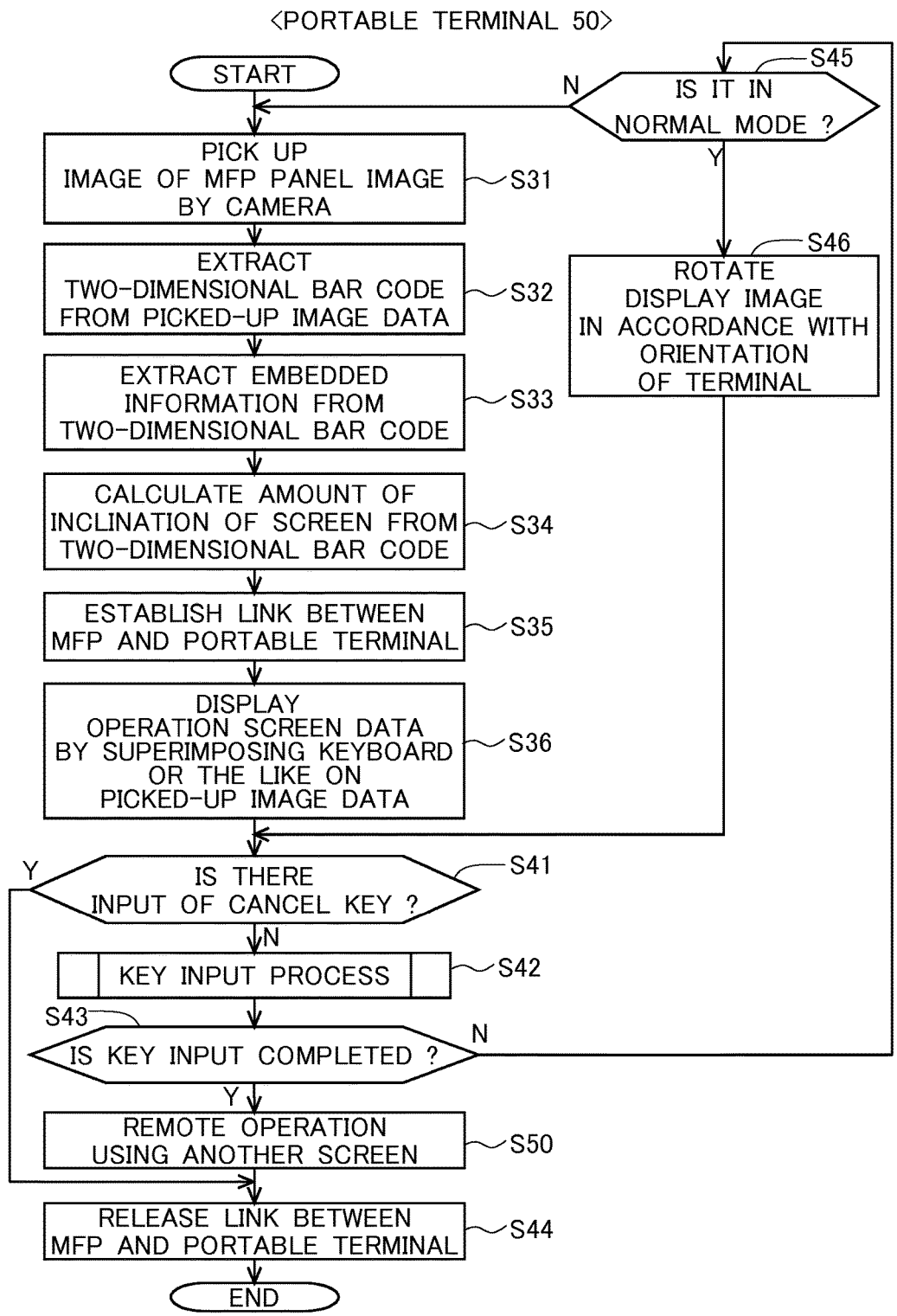
FIGS. 5 to 7 are flowcharts showing an operation of the portable terminal.
Figure 6:
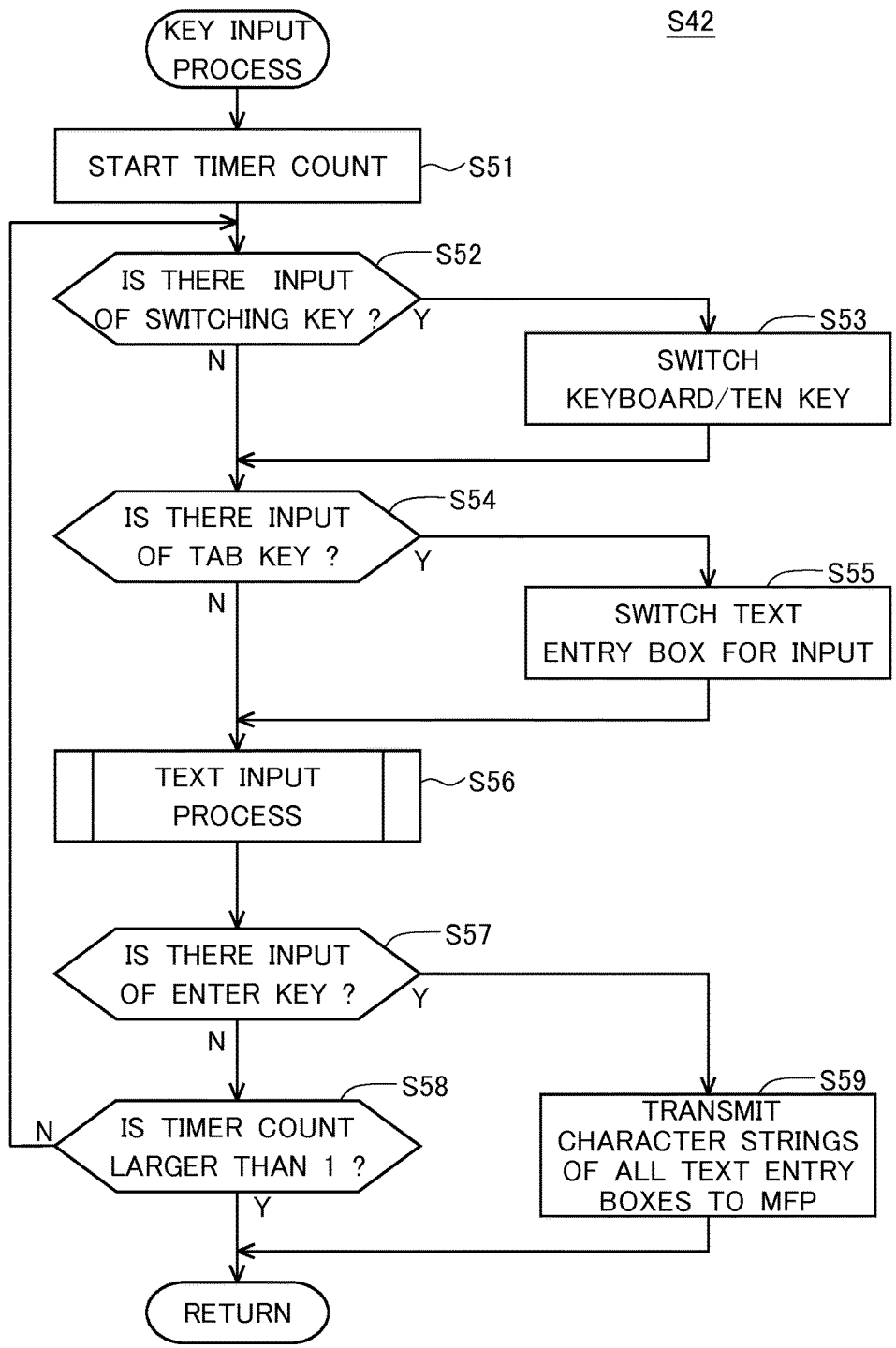
Figure 7:
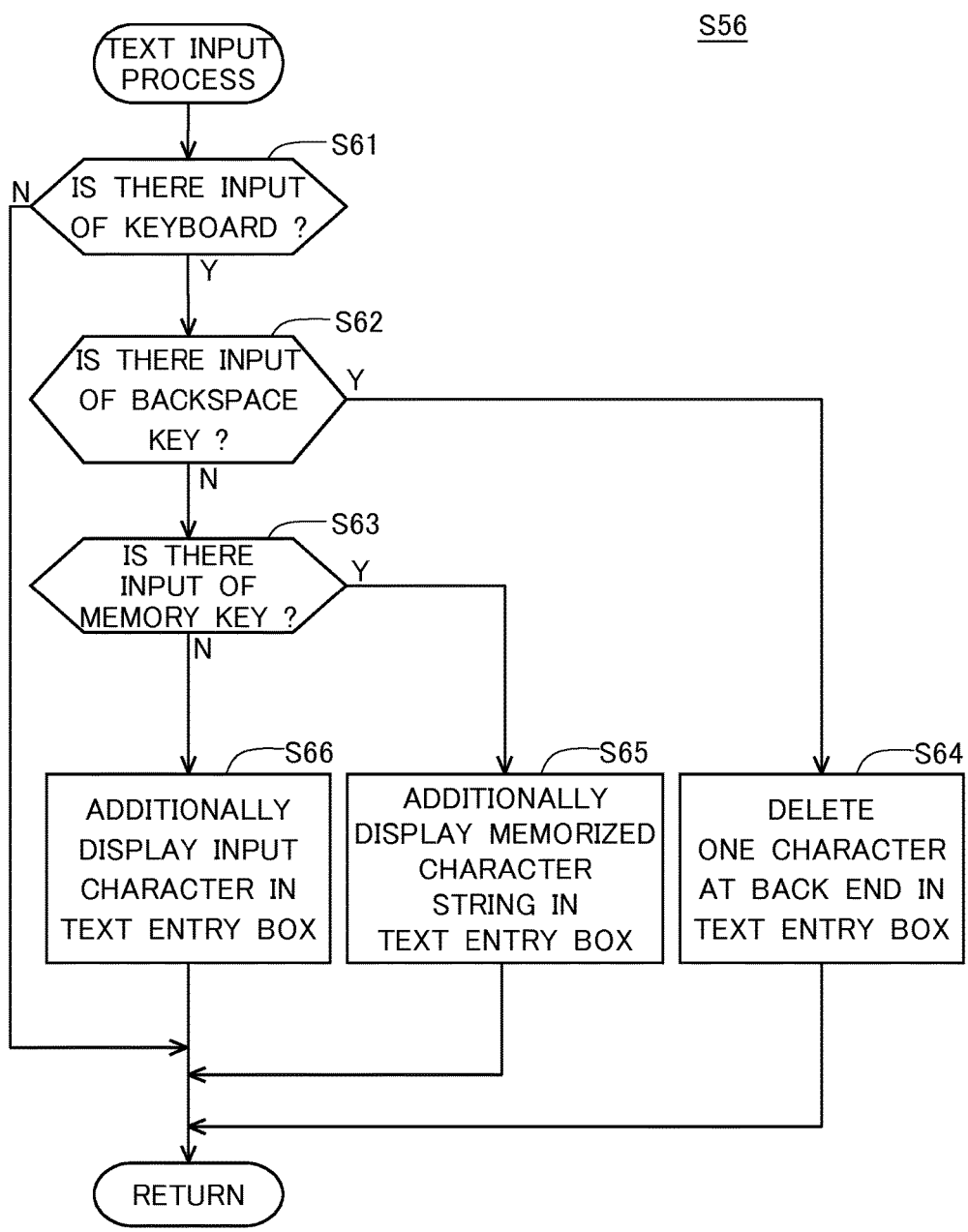

FIG. 4 is a flowchart showing an operation of the MFP 10. FIGS. 5 to 7 are flowcharts showing an operation of the portable terminal 50. FIG. 8 is a timing chart showing an exemplary operation of the image forming system 1. Further, in FIGS. 5 to 8, shown are the operations in the high security mode.

Herein, as above-described some of the operation screens 200, the "login screen" is shown as an example. In other words, description will be made, centering on a case where a character input operation to the login screen is performed, as the character input operation to the operation screen 200.

First, in Step S11 (FIG. 4), the MFP 10 (the screen generation part 15 and the like) acquires screen information (operation screen information) of the login screen (operation screen) 200 for receiving a login operation from a user. Further, the MFP 10 determines whether the operation mode thereof is the normal mode or the high security mode (Step S12).

When the operation mode of the MFP 10 is the normal mode, the process goes from Step S12 to Step S20. In this case, for example, the login screen 200 (201) shown in FIG. 9 is displayed.

The login screen 201 comprises three buttons 211, 212, and 241, two character input fields 231 and 232, a software keyboard 251, and a character input parts display frame 261.

The character input fields 231 and 232 are input fields for characters. In more detail, the character input field 231 is an input field for user ID (in other words, the character input field for displaying input characters relevant to the user ID) and the character input field 232 is an input field for password (in other words, the character input field for displaying input characters relevant to the password). On the touch panel 25, characters can be inputted to the character input fields (referred to also as text entry boxes) 231 and 232 by using the software keyboard (character input part) 251 displayed in the character input parts display frame 261.

Further, the button 211 is arranged (proximately arranged) correspondingly to the character input field (user ID input field) 231. The label characters "User ID" are attached to the button 211, and it is indicated that the character input field 231 adjacent to the button 211 is the input field for user ID. In other words, the button 211 is an (input) information name display field indicating a type name "User ID" of information to be inputted to the character input field (user ID input field) 231.

Similarly, the button 212 is arranged correspondingly to the character input field (password input field) 232. The label characters "Password" are attached to the button 212, and it is indicated that the character input field 232 adjacent to the button 212 is the input field for password. In other words, the button 212 is an (input) information name display field indicating a type name "Password" of information to be inputted to the character input field (password input field) 232.

The button 241 is a cancel button. When the button 241 is pressed, the state goes to a standby state (instead of the login information input state). Further, in the standby state, a standby screen (not shown) for receiving a transition instruction to the login information input state is displayed on the touch panel 25.

The login screen 201 is generated by synthesizing these parts 211, 212, 241, 231, 232, 251, and 261.

In the normal mode, the input operation of the user ID and the password is performed by using the login screen 201. Specifically, the login screen 201 is transmitted from the MFP 10 to the portable terminal 50, and the portable terminal 50 performs the above-described operations (display of the screen, reception of operation input, transmission of operation position information, and the like) to thereby remotely operate the MFP 10. Alternatively, also by performing a direct operation to the login screen 201 displayed on the touch panel 25, the input operation of the user ID and the password can be performed.

On the other hand, when the operation mode of the MFP 10 is the high security mode, the process goes from Step S12 to Step S13 and the following steps. In this case, for example, a login screen 200 (202) shown in FIG. 11 is displayed on the touch panel 25. The login screen 202 comprises three buttons 211, 212, and 241, two character input fields 231 and 232, the character input parts display frame 261, and the two-dimensional bar code image 262. In the high security mode, the login operation (the input operation of the user ID and the password, and the like) is performed by using the login screen 202. Further, in the high security mode, the touch panel 25 of the MFP 10 receives only a direct operation corresponding to the cancel button 241. On operations other than the above direct operation of cancel, the MFP 10 receives only the remote operation using the portable terminal 50.

The login screen 202 (FIG. 11) has the two-dimensional bar code image (code image) 262 instead of the software keyboard 251, as can be seen from the comparison with the login screen 201 (FIG. 9). In other words, in the high security mode, the software keyboard 251 displayed in the normal mode is not displayed on the touch panel 25, and the bar code image 262, instead of the software keyboard 251, is displayed on the touch panel 25. The bar code image 262 is displayed at a location where the software keyboard 251 is arranged in the touch panel 25.

Figure 12:
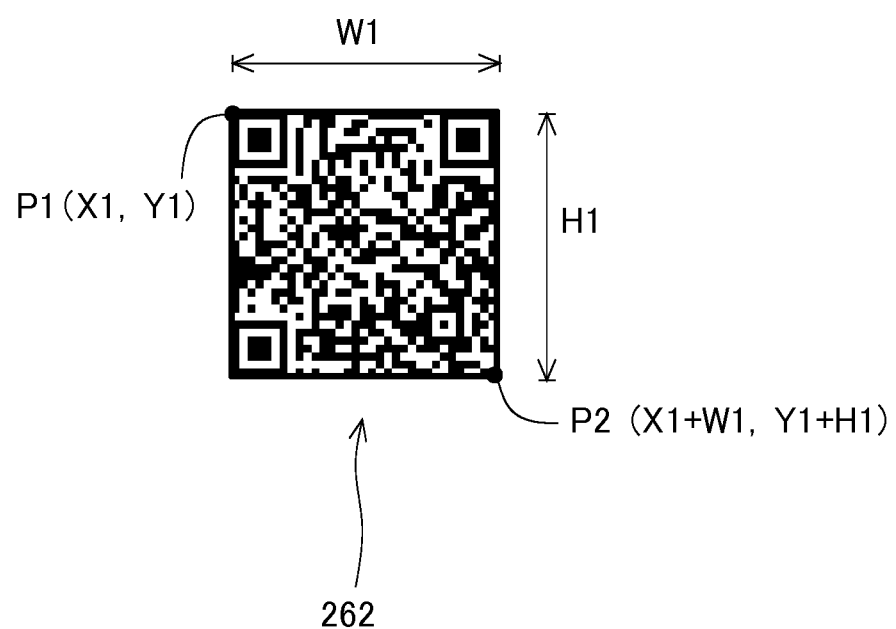
FIG. 12 is a view showing the code image.

In more detail, first, in Step S13 (FIG. 4), the screen generation part 15 performs a generation process of the bar code image (referred to also simply as bar code) 262 (FIG. 12).

Specifically, as shown in FIG. 10, in the bar code image 262, information on "type of part", "position", "size", and "others" of the plurality of parts 211, 212, 241, 231, 232, 261, and 262 is coded and embedded. FIG. 10 is a view showing various information embedded in the bar code image 262.

As shown in the "item" field of FIG. 10, for example, type information ("two-dimensional bar code", "user interface (character input part)", "button", "text entry box", or the like) of each part is coded and embedded.

Further, as shown in the "position (X, Y)" field of FIG. 10, information on the position (the position in the X direction and the position in the Y direction) (X, Y) of each part in the login screen (operation screen) 200 is coded and embedded. Similarly, in the "size (X, Y)" field of FIG. 10, information on the size (the size W (width) in the X direction and the size H (height) in the Y direction) (W, H) of each part in the login screen 200 is coded and embedded. Further, the position information of each part may be given as position information (position information expressed in a coordinate system of the touch panel 25) of a reference point of each part (an upper left point of each part area, or the like) in the login screen.

For example, as shown in the field of the item "two-dimensional bar code" of FIG. 10, the position (X1, Y1) and the size (W1, H1) of the bar code image 262 itself are coded and embedded in the bar code image 262 as the information on the "two-dimensional bar code".

Further, as shown in the field of the item "user interface" of FIG. 10, the position (X2, Y2) and the size (W2, H2) of the character input parts display frame 261 are coded and embedded in the bar code image 262 as the information on the "user interface (character input part)". Since the character input parts display frame 261 is an area for displaying the character input part 273, the character input parts display frame 261 may be expressed as a display area for the character input part 273.

Furthermore, as shown in the field of the item "button 1" of FIG. 10, the position (X3, Y3) and the size (W3, H3) of the button 211 are coded and embedded in the bar code image 262 as the information on the "button". Similarly, the position (X4, Y4) and the size (W4, H4) of the button 212 and the position (X5, Y5) and the size (W5, H5) of the button 241 are also coded and embedded in the bar code image 262.

Further, as shown in the field of the item "text entry box" of FIG. 10, the position (X6, Y6) and the size (W6, H6) of the character input field 231 are coded and embedded in the bar code image 262 as the information on the "text entry box". Similarly, the position (X7, Y7) and the size (W7, H7) of the character input field 232 are also coded and embedded in the bar code image 262.

Furthermore, additional information of "others" on each part is coded and embedded as necessary.

For example, the label information (name information) (e.g., "User ID", "Password", or "Cancel") of each of the plurality of buttons 211, 212, and 241 is coded and embedded in the bar code image 262. Further, information on maximum number of characters (information on the maximum number of characters which can be displayed (inputted) in each input field) (for example, "30" characters) of each of the plurality of character input fields 231 and 232 is also coded and embedded in the bar code image 262. Furthermore, information (specification information) for specifying the type of "user interface" displayed in the character input parts display frame 261 (for example, specification information for specifying "keyboard") is embedded.

Further, a check ID (identification information) (e.g., "Abcde12") on a link target (the portable terminal 50) of the MFP 10 is also coded and embedded in the bar code image 262.

In the next Step S14 (FIG. 4), the screen generation part 15 performs a process for generating the login screen 202. Specifically, the software keyboard 251 in the login screen 201 is replaced with the bar code image 262, and a plurality of parts 211, 212, 241, 231, 232, 262, and 261 after the replacement are synthesized, to thereby generate the login screen 202.

Then, in Step S15, the login screen 202 generated in Step S14 is displayed on the touch panel 25 of the MFP 10. The login screen 202 is displayed as an imaging object screen (of the picked-up image 500) by the portable terminal 50.

Further, in Step S16, the MFP 10 (the permission part 16 and the like) determines whether or not an effective link establishment request is received. Specifically, when a link establishment request with a normal check ID (described later) is transmitted from the portable terminal 50, it is determined that an effective link establishment request is received. In more detail, as described later, the check ID (see the lowermost stage of FIG. 10) embedded in the bar code image 262 in the picked-up image 500 is recognized and extracted by the portable terminal 50 (Step S33 (FIG. 5)), and the link establishment request including the check ID is transmitted from the portable terminal 50 to the MFP 10 (Step S35 (FIG. 5)). Then, when the MFP 10 receives the link establishment request including the check ID, it is determined that an effective link establishment request is received (Step S16).

Receiving the link establishment request with the check ID from the portable terminal 50 (Step S16), the MFP 10 checks the coidentity between the check ID received from the portable terminal 50 and the check ID embedded in the bar code image 262 and issued (see FIG. 10). When the MFP 10 confirms the coidentity, the MFP 10 (the transmitting part 4*a* and the like) acknowledges the link establishment request from the portable terminal 50 and permits establishment of link with the portable terminal 50, and also sends a link establishment permission (information) back to the portable terminal 50. The portable terminal 50 receives the link establishment permission, and the communication link between the MFP 10 and the portable terminal 50 is established.

When it is not determined that an effective link establishment request is received, the process goes from Step S16 to Step S18, and it is determined whether or not the cancel button 241 in the touch panel 25 is pressed. When it is not determined in Step S18 that the cancel button 241 is pressed, the process goes back to Step S16 and the same operation is repeated. On the other hand, when it is determined in Step S18 that the cancel button 241 in the touch panel 25 is pressed, the process goes to Step S19. In Step S19, the state goes to the standby state, not the login information input state, and the standby screen (not shown) for receiving the transition instruction to the login information input state is displayed on the touch panel 25 and the process of FIG. 4 is completed. After that, in the standby screen, when the transition instruction to the login information input state is received, the operation in Step S11 is restarted.

On the other hand, when it is determined that an effective link establishment request is received, the process goes to Step S17. In Step S17, the MFP 10 (the permission part 16 and the like) permits the link (communication link) between the portable terminal 50 and the MFP 10. As described later, by performing a terminal specification process using the check ID embedded in the bar code image 262 in the picked-up image 500 which is obtained by imaging the touch panel 25 of the MFP 10, it is possible to reliably specify the portable terminal 50 which is present near the MFP 10 and is to be linked with the MFP 10.

After that, the MFP 10 receives various information from the portable terminal 50 on condition that the link with the portable terminal 50 is permitted. For example, the MFP 10 receives, from the portable terminal 50, the login information (a group of character codes indicating each of the login ID and the password, or the like) inputted into the character input screen of the portable terminal 50 from the user. Then, the MFP 10 (the judgment part 14 and the like) performs an authentication process on the basis of the received login information (authentication information). Confirming that the received login information (authentication information) is normal, the MFP 10 displays a next screen (an operation screen after the login) on the touch panel 25 and transmits the image data of the screen (in other words, the image data of the remote operation screen) to the portable terminal 50. After that, the remote operation of the MFP 10 is similarly performed by the portable terminal 50 until the link is cut off.

Next, with reference to FIGS. 5 to 7 and the like, description will be made, centering on the operation of the portable terminal 50.

In a state where the operation screen 200 (202) (FIG. 11) for the high security mode is displayed on the touch panel 25 of the MFP 10 (see Step S15 of FIG. 4), the user performs an input operation with the portable terminal 50, not the touch panel 25.

Figure 13:
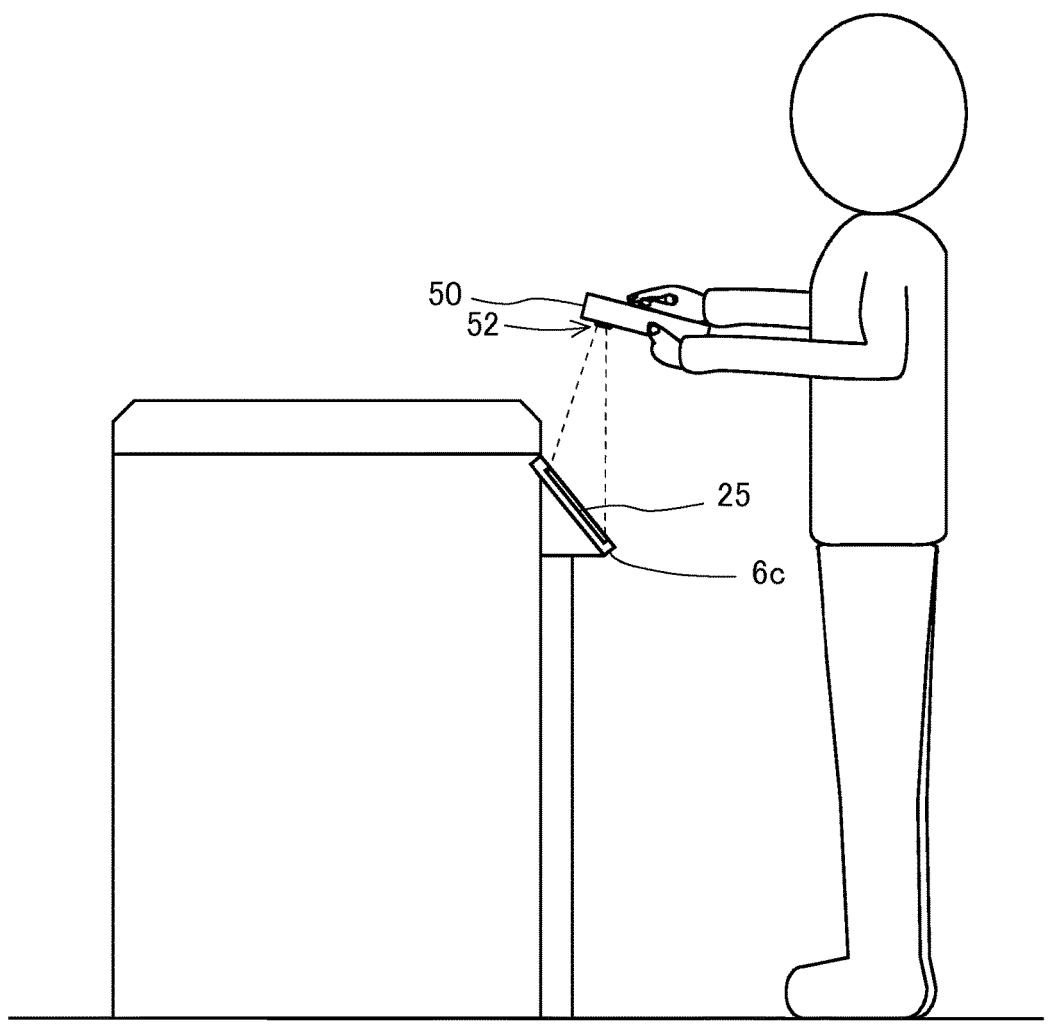
FIG. 13 is a view showing a manner where a user picks up an image of a touch panel of the MFP with the portable terminal to perform a remote login into the MFP.
Figure 14:
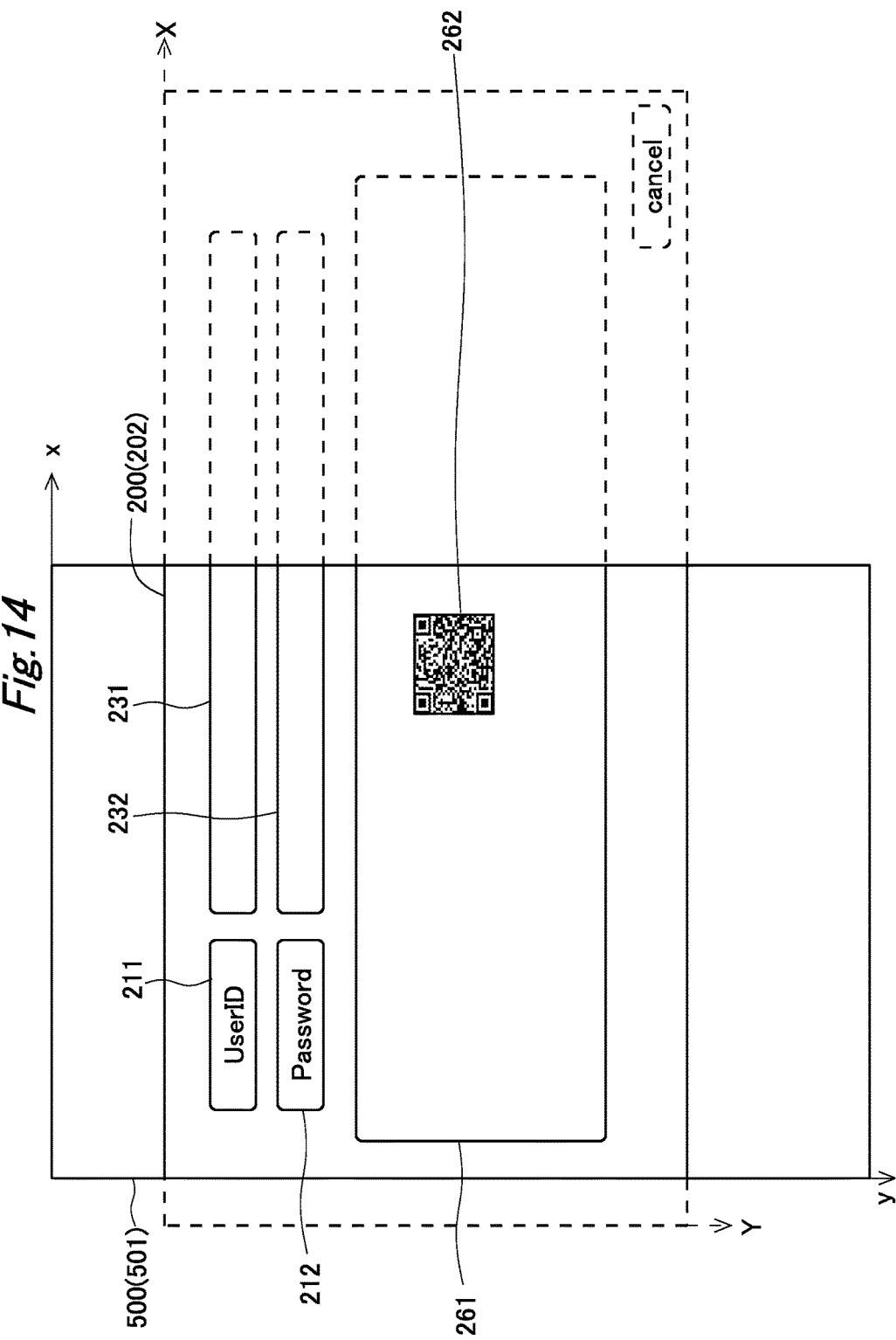
FIG. 14 is a view showing a picked-up image taken by the portable terminal.

Specifically, first, in Step S31 (FIG. 5), the user uses the portable terminal 50 during execution of the program for remote operation, to perform an image pickup process for picking up an image of the touch panel 25. In more detail, the login screen 202 displayed on the touch panel 25 is imaged by the user with the portable terminal 50 (the image pickup part 52 and the like) (see FIG. 13). FIG. 13 is a view showing a manner where the user picks up an image of the touch panel 25 of the MFP 10 with the portable terminal 50, to thereby perform a remote login into the MFP 10. FIG. 14 is a view showing a picked-up image 500 (501) taken by the portable terminal 50. FIG. 14 shows a state where a portion of the imaging object (the touch panel 25) is present within an imaging range of the portable terminal 50. In FIG. 14, another portion of the imaging object (the touch panel 25) which is present out of the imaging range of the portable terminal 50 is indicated by broken lines.

Next, in Step S32, the bar code image 262 is extracted from the picked-up image 500. At that time, the portable terminal 50 (the bar code information acquisition part 64, the position determination part 65, and the like) obtains the position and size of the bar code image 262 in the picked-up image 500 (501) by a recognition process for the two-dimensional bar code (the image recognition process for the picked-up image 500).

Further, in Step S33, the portable terminal 50 (the bar code information acquisition part 64 and the like) extracts and acquires the information (see FIG. 10) included in the bar code image 262 in the picked-up image 500 from the bar code image 262 in the picked-up image 500. By the recognition process (analysis process) for the two-dimensional bar code, the information embedded in the bar code image 262 is extracted and acquired.

For example, information (including the label information (name information) and the information on maximum number of characters) (FIG. 10) on the position and size of each of the parts 211, 212, 241, 231, 232, 261, and 262 (also see FIG. 11), and the like, are extracted and acquired.

Especially, the display command included in the bar code image 262 (specifically, specification information ("keyboard") on "user interface (character input part)", or the like) is also extracted from the bar code image 262. Further, when the specification information on the user interface is included in the bar code image 262, it is considered that the display command to display the user interface (herein, "keyboard") specified by the specification information is given.

Further, the display position information of the character input fields 231 and 232 in the operation screen 200 and the display position information of the buttons 211, 212, and 241 in the operation screen 200, and the like, are acquired.

Next, in Step S34, the portable terminal 50 (the position determination part 65 and the like) acquires the position and size of the bar code image 262 in the picked-up image 500 (501) on the basis of the result of the recognition process for the two-dimensional bar code (image recognition process for the picked-up image 500) (Step S32). The information on the position and size of each part in the picked-up image 500 is acquired as the position information expressed in a coordinate system of the picked-up image 500. Then, the portable terminal 50 performs the coordinate conversion process between the coordinate system (XY coordinate system) of the touch panel 25 and the coordinate system (xy coordinate system) of the picked-up image 500 for each position by using the information (information acquired in Step S33) on the position and size of the bar code image 262 in the picked-up image 500 (501). The result of the coordinate conversion process is used in the later Steps S36, S56, and the like.

In Step S34, the following coordinate conversion process is performed on the basis of the information (herein, (X1, Y1, W1, H1)) indicating the position and size of the bar code image 262 in the operation screen 200 and the information (herein, (x1, y1, w1, h1)) indicating the position and size of the bar code image 262 in the picked-up image 500.

Figure 15:
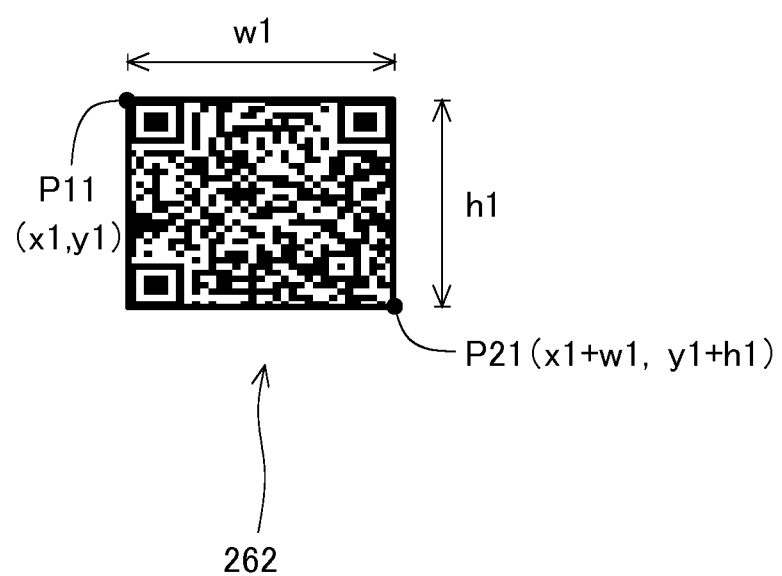
FIG. 15 is a view showing the code image in the picked-up image.

Herein, it is assumed that it is recognized that the bar code image 262 (also see FIGS. 11 and 12) having a size (W1, H1) in the touch panel 25 has a size (w1, h1) in the picked-up image 500 (501). Further, it is assumed that with respect to the bar code image 262 (also see FIG. 12) arranged at a position P1 (X1, Y1) in the touch panel 25, a display position P11 (x1, y1) (also see FIG. 15) of the bar code image 262 in the picked-up image 500 (501) is recognized.

In this case, the variable power rate (w1/W1, h1/H1) in respective directions of these coordinate systems is obtained as a variable power factor (size conversion factor). For example, when (W1, H1)=(100, 100) and (w1, h1)=(200, 150), (200/100, 150/100)=(200%, 150%) is obtained as the size conversion factor in respective directions. Further, in the picked-up image 500, it is also found that the longitudinal direction is compressed with respect to the transverse direction by 75% (=150/200=(h1/H1)/(w1/W1)). This corresponds to that the touch panel 25 is imaged in the picked-up image 500, being compressed in the longitudinal direction, due to the inclination of the optical axis of the image pickup part 52 of the portable terminal 50 with respect to the normal of the touch panel 25 (the optical axis not being in parallel with the normal).

Further, the position (x, y) of each part in the picked-up image 500 is expressed as Eq. (1) by using the position (X, Y) of each part in the touch panel 25, and the like. Eq. (1) is derived in consideration of parallel displacement of the reference positions P1 and P11 in both the coordinate systems of the bar code image 262 to the respective origin points of these coordinate systems and the above-described size conversion factor.

$$x = x1 + \frac{w1}{W1} \times (X - X1)$$
$$y = y1 + \frac{h1}{H1} \times (Y - Y1) \quad (1)$$

By using Eq. (1), on the basis of the recognition result of the position (x1, y1) and the size (w1, h1) of the bar code image 262 in the picked-up image 501, and the like, the position (xi, yi) and the size (wi, hi) (where i=1, 2, 3, . . . ) of each of the other parts 261, 211, 212, 241, 231, and 232 in the picked-up image 500 can be calculated (see FIG. 16). In other words, by performing the coordinate conversion process on the basis of Eq. (1) on the position (Xi, Yi) and the size (Wi, Hi) of each of these parts 261, 211, 212, 241, 231, and 232 in the operation screen 200, the position (xi, yi) and the size (wi, hi) (where i=1, 2, 3, . . . ) of each of these parts in the picked-up image 500 are specified.

FIG. 16 is a view showing the position information and the like of each part in the picked-up image 500 which is acquired by using the bar code image 262. In FIG. 16, shown is the information on the position and size of each part in the picked-up image 500 in contrast with that in FIG. 10. In the uppermost stage (the field of "two-dimensional bar code") of FIG. 16, the recognition result (x1, y1, w1, h1) on the position and size of the bar code image 262 in the picked-up image 501 is shown as the information on the position and size of the bar code image 262. On the other hand, in each stage lower than the field of "two-dimensional bar code" of FIG. 16, the calculation result ((x2, y2, w2, h2), (x3, y3, w3, h3), or the like) on the position and size of each part in the picked-up image 500 (501) is shown.

It is found, for example, that the character input parts display frame 261 arranged at the position (X2, Y2) in the touch panel 25 is displayed at the position (x2, y2) in the picked-up image 500. In other words, the position (x2, y2) of the character input parts display frame 261 in the picked-up image 500 is calculated. Similarly, the size (w2, h2) of the character input parts display frame 261 in the picked-up image 500 is also calculated.

Further, it is found that the character input field 231 displayed at the position (X6, Y6) in the touch panel 25 is displayed at the position (x6, y6) in the picked-up image 500. In other words, the position (x6, y6) of the character input field 231 in the picked-up image 500 is calculated. Similarly, the size (w6, h6) of the character input field 231 in the picked-up image 500 is also calculated.

Furthermore, similarly, the position and size (x7, y7, w7, h7) of the character input field 232 in the picked-up image 500 are calculated. Further, the display position (x, y) and the size (w, h) of each of the other elements 261, 211, 212, and the like in the picked-up image is also acquired by the same coordinate conversion process.

Thus, by recognizing the position and size of only the bar code image 262 among the plurality of parts in the picked-up image 500, it is possible to acquire the information on the position and size of each of the other parts 261, 211, 212, 241, 231, and 232. The position and size of each part other than the bar code image 262 can be calculated (estimated) by performing the above-described coordinate conversion process on the information (the information indicating the position and size of each part in the operation screen 202) (see FIG. 10) included, being coded, in the bar code image 262. In other words, the position and size of each part other than the bar code image 262 can be acquired without any direct image processing on each part.

Further, in the present preferred embodiment, though no rotation element between these coordinate systems is taken into consideration, for simplification, the coordinate conversion process may be performed on these coordinate systems in consideration of the rotation element.

In Step S35, a communication link is established between the MFP 10 and the portable terminal 50. Specifically, the link establishment request with the check ID (identification information) extracted from the bar code image 262 is transmitted from the portable terminal 50 to the MFP 10.

Receiving the link establishment request with the check ID from the portable terminal 50 (Step S16), the MFP 10 (the communication control part 11, the permission part 16, and the like) checks the coidentity between the check ID received from the portable terminal 50 and the check ID embedded in the bar code image 262 and issued (see FIG. 10). When the coidentity is confirmed, the MFP 10 (the communication control part 11, the permission part 16, and the like) acknowledges the link establishment request from the portable terminal 50 and permits establishment of link with the portable terminal 50, and also sends a link establishment permission (information) back to the portable terminal 50. The portable terminal 50 receives the link establishment permission (information) from the MFP 10, and the communication link between the MFP 10 and the portable terminal 50 is established.

Herein, the MFP 10 (the permission part 16 and the like) establishes the communication link with the portable terminal 50 on condition that the coidentity between the check ID embedded in the bar code image 262 (the check ID issued in advance by the MFP 10) and the check ID extracted from the bar code image 262 in the picked-up image 500 (the check ID transmitted from the portable terminal 50) is confirmed. It is thereby possible to reliably specify the portable terminal 50 which images the bar code image 262 to perform login to the MFP 10 (the portable terminal 50 which is present near the MFP 10).

Especially, even when there are a plurality of portable terminals 50 within a communication zone of the MFP 10 (for example, in a communicable area within a 10-meter radius), it is possible to reliably specify the portable terminal 50 which images the bar code image 262 to perform login to the MFP 10 among the plurality of portable terminals 50.

Further, it is preferable that the MFP 10 should issue a different check ID every time when a remote login is received (or at a predetermined time interval). It is thereby possible to more reliably specify the portable terminal 50 which actually images the bar code image 262 to perform login to the MFP 10 at that point in time.

Figure 17:
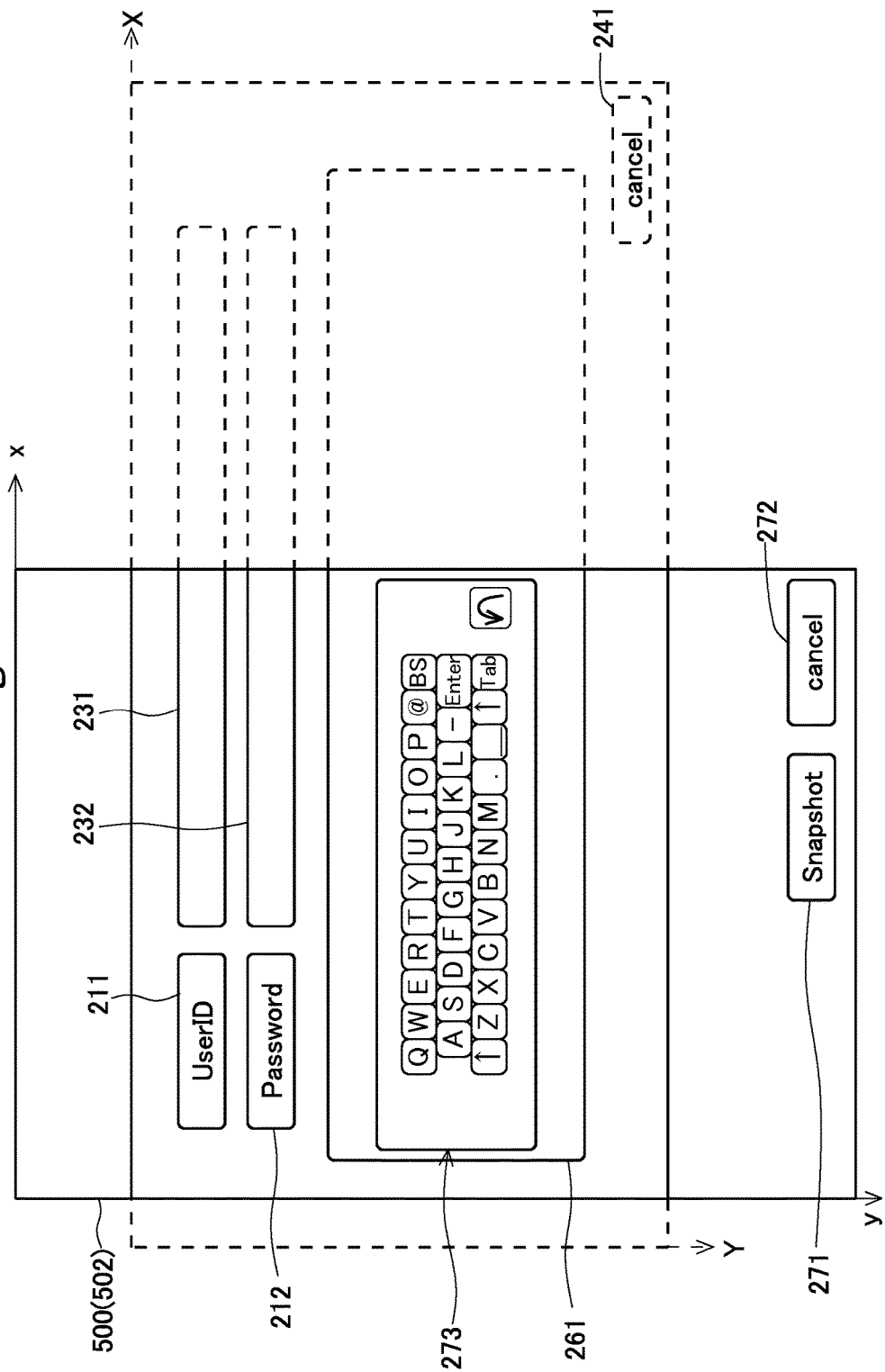
FIG. 17 is a view showing a character input screen displayed on a touch panel of the portable terminal.

In the next Step S36, a picked-up image 500 (502) (see FIG. 17) which is obtained by partially changing the original picked-up image 500 (501) (see FIG. 14) is displayed on the touch panel 75. Specifically, as shown in FIG. 17, a character input part 273 (herein, a keyboard (in more detail, a software keyboard)), a snapshot button 271, and a cancel button 272 are superimposed on the original picked-up image 500 (501), to be displayed. FIG. 17 is a view showing a screen displayed on the touch panel 75.

Further, the plurality of parts 211, 212, 231, 232, and 261 included in the picked-up image 500 are displayed without any change, not being written by the portable terminal 50, by using the picked-up image 500 (501).

In more detail, the portable terminal 50 deletes the bar code image 262 in the picked-up image 500 (501) from the picked-up image 500 by image processing and displays a keyboard (character input part) 273, instead of the bar code image 262. The keyboard 273 is stored in the storage part 55 of the portable terminal 50 in advance (at the installation of the remote operation program, or the like). The keyboard 273 is extracted from the storage part 55 and displayed, on the basis of the display command (the display command to display the "keyboard" as the character input part) embedded in the bar code image 262. The keyboard 273 is displayed at an appropriate position in the character input parts display frame 261 of the picked-up image 500. The character input parts display frame 261 is also represented as a display target area for the character input part (keyboard) 273.

In more detail, the display position is determined on the basis of the coordinate conversion result of Step S34, and then the specified character input part (herein, "keyboard" (software keyboard)) 273 is superimposed on the picked-up image 500 and displayed (see FIG. 17). Specifically, the display position and the like of the character input part 273 in the picked-up image 500 are determined on the basis of the information on the position and size of the character input parts display frame 261 in the picked-up image 500. More specifically, the display position and display size of the character input part 273 are determined so that the character input part 273 may be arranged inside an area in the picked-up image 500 where the character input parts display frame 261 is displayed (in other words, a product area (AND area) of the entire area of the picked-up image 500 and the display area of the character input parts display frame 261). In still more specifically, the display position and display size thereof are determined so that the character input part 273 may be displayed as large as possible in the AND area. Then, in accordance with the determined display position and display size, the character input part 273 is arranged.

Further, as the information on the position and size of the character input parts display frame 261 in the picked-up image 500, used is the information acquired by the coordinate conversion process in Step S34 (specifically, the position and size (x2, y2, w2, h2) of the character input parts display frame 261 in the picked-up image 500). In the above-described Step S34, the coordinate conversion process based on the information on the position and size of the bar code image 262 in the picked-up image 500 and the information on position and size of the bar code image 262 in the operation screen 200 is performed. Then, in the coordinate conversion process, the position and size (x2, y2, w2, h2) of the character input parts display frame 261 (the display area of the character input part 273) in the picked-up image 500 is specified, on the basis of the position and size of the character input parts display frame 261 (display area of the character input part 273) in the operation screen 200.

Figure 18:
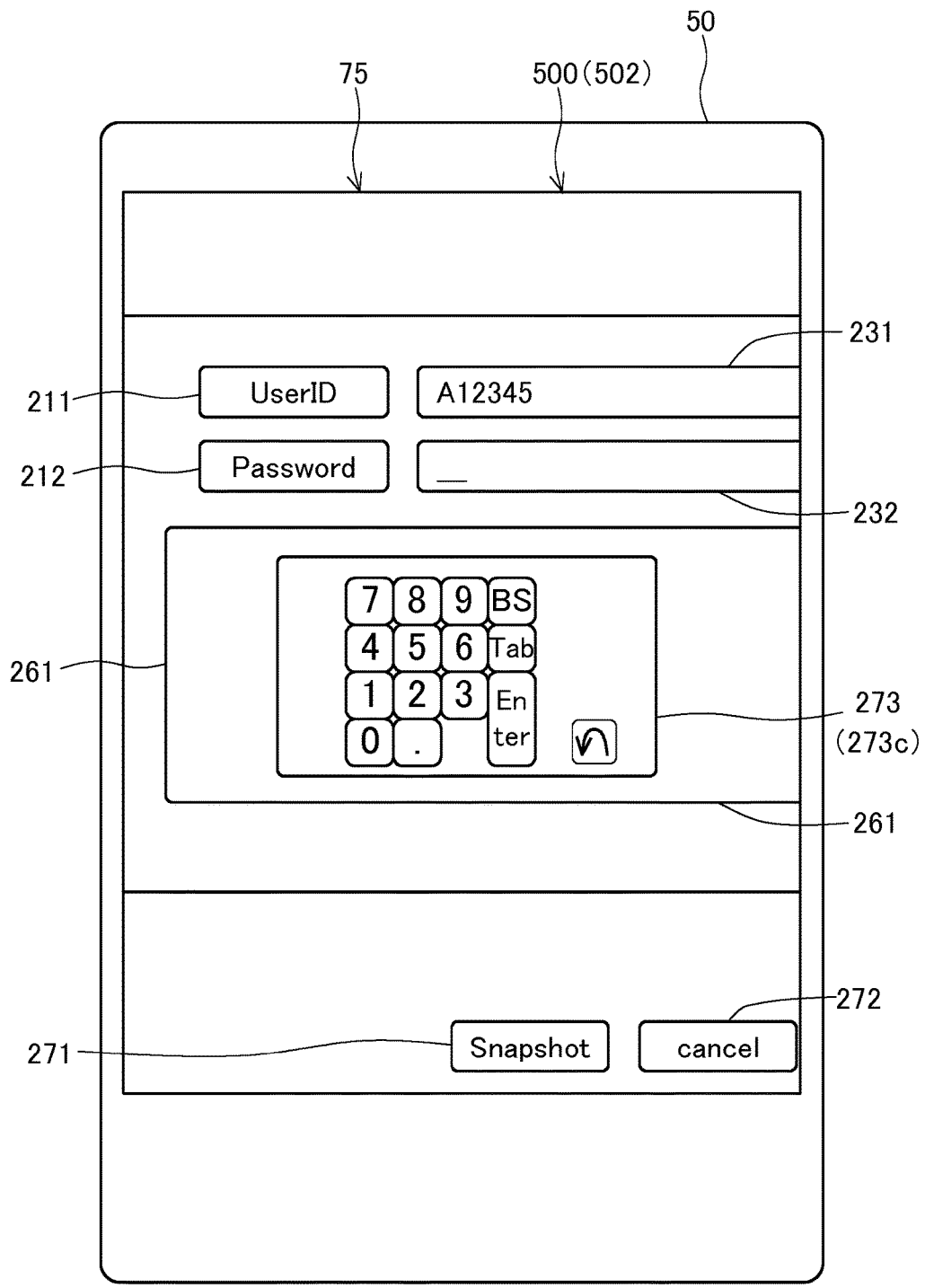
FIG. 18 is a view showing a manner where an image obtained by synthesizing a keyboard of FIG. 21 and the picked-up image is displayed on the touch panel of the portable terminal.
Figure 19:
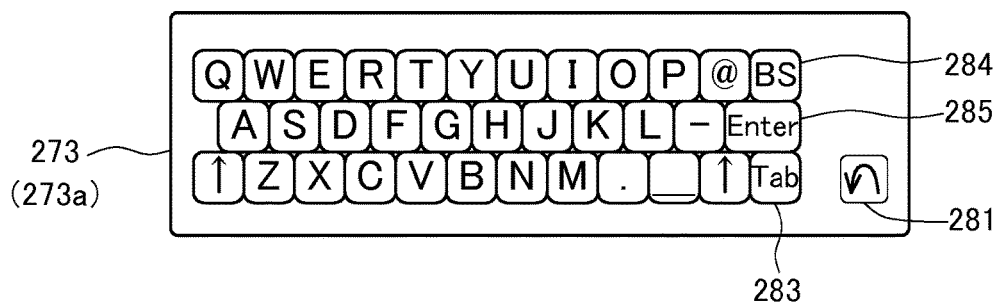
FIGS. 19 to 21 are views each showing a keyboard (character input screen)
Figure 20:
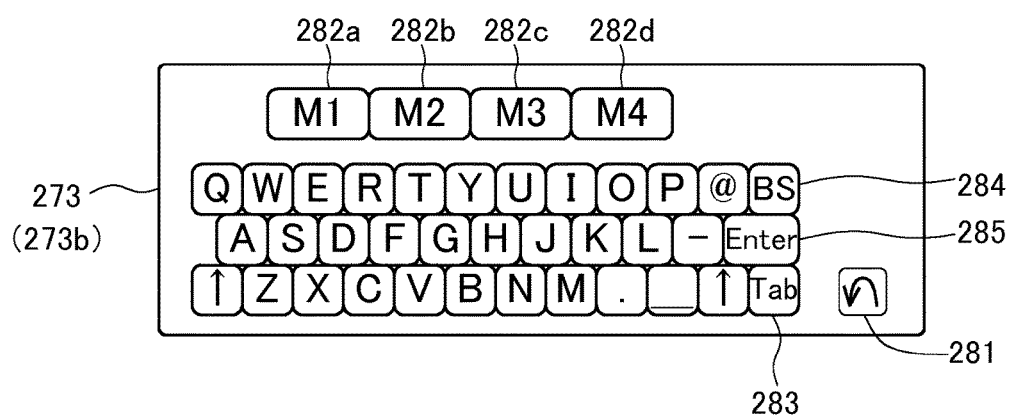
Figure 21:
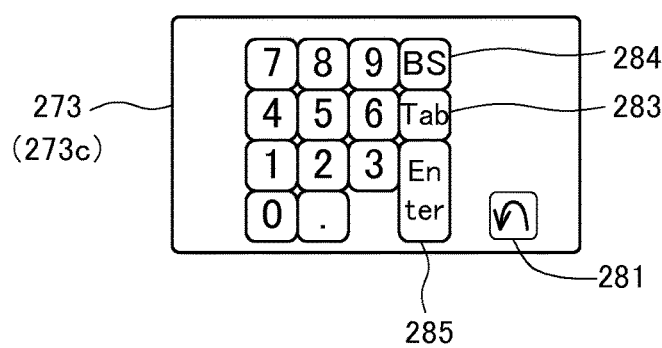

Herein, as the keyboard 273, three types of keyboards 273a, 273b, and 273c shown in FIGS. 19 to 21 are selectively used. The keyboards 273a and 273b are each an image showing a keyboard mainly consisting of alphabet character keys. The keyboard 273b is different from the keyboard 273a in having memory keys 282a to 282d. Further, the keyboard 273c is an image showing a keyboard (ten key) mainly consisting of numeric keys. In each of the keyboards 273a, 273b, and 273c, provided are a switching key 281, a tab key 283, a backspace key 284, and an enter key 285. These three types of keyboards 273a, 273b, and 273c are displayed, being switched from one to another in response to the press of the switching key 281. FIG. 18 shows a manner where an image obtained by synthesizing the keyboard 273c and the picked-up image 500 is displayed (superimposedly displayed) on the touch panel 75.

Further, the portable terminal 50 displays (synthetically displays) thereon an image obtained by superimposing the snapshot button 271 and the cancel button 272 on appropriate positions (positions on nearly lower right in FIGS. 17 and 18) in the picked-up image 500 (502). The picked-up image 500 (502) is also represented as a character input screen since it is a screen for receiving a character input from a user.

Thus, on the touch panel 75 of the portable terminal 50, displayed is the character input screen 502 which is obtained by synthesizing the character input part 273 and the picked-up image 501, on the basis of the display command included in the bar code image 262 in the picked-up image 501.

In any mode other than a still image mode (described later), the picked-up image 500 (502) is updated at a predetermined update time interval Δt (e.g., 1 second) and displayed.

In the next Step S41 (FIG. 5), when it is determined that the cancel button 272 in the picked-up image 500 is pressed, the process goes to Step S44 and the communication connection (communication link) between the MFP 10 and the portable terminal 50 is released (cut off). On the other hand, in any case other than this, the process goes to Step S42.

In Step S42, various key input processes and the like are performed. Further, Step S42 is repeatedly performed every the update time interval Δt (e.g., 1 second) of the picked-up image. First, in Step S51 (FIG. 6), a timer is reset and a count operation is started.

In Step S52, when it is determined that the input of the switching key 281 is received, a switching operation of keyboard types is performed (Step S53). Every time when the switching key 281 is pressed, the respective keyboards shown in FIGS. 19 to 21 are sequentially switched and displayed. Specifically, in the state where the keyboard 273a (FIG. 19) is displayed, when the switching key 281 is pressed, the keyboard 273b (FIG. 20) is displayed. Further, in the state where the keyboard 273b is displayed, when the switching key 281 is pressed, the keyboard 273c (FIG. 21) is displayed. Furthermore, in the state where the keyboard 273c is displayed, when the switching key 281 is pressed, the keyboard 273a is displayed.

When it is determined that the input of the tab key 283 is received (Step S54), a switching operation of the character input field (text entry box) is performed (Step S55). Every time when the tab key 283 is pressed, the character input field for input is sequentially switched between the plurality of character input fields 231 and 232.

When it is determined that the input of the backspace key 284 is received (Steps S56, S61, and S62 (FIG. 7)), deleted is one character at the back end of the character input field for input (text entry box) (231 or 232) (Step S64).

When it is determined that the input of any one of the memory keys (282a to 282d) is received (Step S63), a character string associated with the pressed memory key is additionally displayed in the character input field for input (Step S65). For example, when the memory key 282a is pressed, a registered content ("A12345" (login ID)) registered with the memory key 282a is additionally displayed in the character input field for input. By using the memory key 282, a plurality of registered characters can be inputted at a time, and it is therefore possible to reduce the time and effort for inputting characters. Further, by registering the login ID with the memory key 282, it is also possible to prevent an incorrect input of the login ID.

When it is determined that the input of other character key is received, the character corresponding to the pressed character key (i.e., the inputted character) is additionally displayed in the character input field for input (Step S66). For example, the key of a character "A" is pressed, the character "A" is additionally displayed in the character input field (231 or the like) for input. Further, the key of a character "1" is pressed, the character "1" is additionally displayed in the character input field (231 or the like) for input. Thus, the character input fields 231 and 232 serve as the input fields (display field) for the character inputted by the character input part 273.

Herein, the display position and the like of each inputted character in the picked-up image 500 are determined as follows. Specifically, by performing the above-described coordinate conversion process (see Step S34 and Eq. (1)) on the information acquired in Steps S31 to S33 (in more detail, the display position information of the character input field (231 or the like) included in the bar code image 262), the position (corresponding position) and size of the character input field (231 or the like) in the picked-up image 500 are specified. Then, on the touch panel 75 of the portable terminal 50, an image obtained by synthesizing the character inputted by the character input part 273 and the character input field (231 or the like) of the picked-up image 500 (the character input field which is present in the picked-up image 500 as a subject) is displayed (superimposedly displayed) on the basis of the information of the corresponding position of the character input field (231 or the like), and the like. At that time, the display position and the like of the character are determined in consideration of how many characters there are before each inputted character in the character input field (231 or the like), and the like. With this determination, for example, the input character string "A12345" relevant to the user ID is displayed in the character input field 231.

Further, when it is determined that the input of the enter key 285 is received (Step S57 (FIG. 6)), the process goes to Step S59. In Step S59, the pieces of information displayed in all the character input fields 231 and 232 (in other words, the input information received by the portable terminal 50 (the character input content such as a group of character codes or the like indicating the input character string)) are transmitted to the MFP 10 (Step S59). For example, the login ID ("A12345") inputted in the character input field 231 and the password ("9876") inputted in the character input field 232 are transmitted from the portable terminal 50 to the MFP 10. In this case, it is determined in Step S43 that the key input is completed, and the process goes to Step S50. In Step S50, the remote operation process is performed by using various operation screens after the login. After the process of Step S50 is completed, in Step S44, the communication connection (communication link) between the MFP 10 and the portable terminal 50 is released (cut off).

Further, when it is not determined that the input of the enter key 285 is received, the process goes to Step S54.

In Step S54, when it is not determined that the time interval Δt has elapsed from the previous imaging time, the process goes back to Step S52, and a key input reception operation continues.

On the other hand, when it is determined in Step S54 that the time interval Δt has elapsed from the previous imaging time on the basis of a timer count result (Step S58), Step S42 is finished and the process returns to Step S31 through Steps S43 and S45. Then, Step S31 and the following steps are performed again. Thus, the picked-up image is updated at a predetermined time interval Δt. Further, in Step S36, the pieces of information inputted to the character input fields 231 and 232 are superimposedly displayed continuously.

Thus, on the touch panel 75, the picked-up image is updated at the predetermined time interval Δt, and the picked-up image which is updated at the predetermined time interval Δt is sequentially displayed. In short, the picked-up image on which the keyboard is superimposed is displayed like a moving image (as a moving image).

Further, in the present preferred embodiment, it is possible to switch a display mode of the portable terminal 50 between a still image mode and a moving image mode in accordance with the press of the snapshot button 271 during the key input reception. Every time when the snapshot button 271 is pressed, the still image mode and the moving image mode are alternately selected. In an initial state, the moving image mode is selected, and after that, when the snapshot button 271 is pressed, the mode goes to the still image mode.

In Step S45, when it is determined that a transition instruction to the still image mode is given (in other words, when the update stop instruction of the picked-up image from the user is received), the update of the picked-up image is stopped, and the process goes to Step S46 (described next) (not to Step S31). Further, the process goes to Step S41 after Step S46, and the portable terminal 50 receives a character input by using the character input part 273 in the picked-up image 502 which is continuously displayed as a still image without being updated (picked-up image on which the character input part 273 is superimposed). In other words, the image obtained by superimposing the character input part 273 on the picked-up image 500 (502) displayed like a still image (as a still image) is displayed and the character input is received by using the character input part 273.

In Step S46, the orientation of the picked-up image 500 to be displayed on the portable terminal 50 is changed as necessary. Specifically, when the orientation of the portable terminal 50 at the point in time when the update stop instruction is received (in other words, at the point in time when the last picked-up image 500 (picked-up image 500 displayed as a still image) is taken) and that of the portable terminal 50 at this point in time are different from each other, the portable terminal 50 (the display control part 63 and the like) changes the orientation of the picked-up image 500 to be displayed on the touch panel 75. In the present application, the "orientation" of the portable terminal 50 is represented as either of the "vertical orientation" (an orientation in which the long side of the substantially-rectangular touch panel 75 extends in the vertical direction) and the "horizontal orientation" (an orientation in which the long side of the substantially-rectangular touch panel 75 extends in the horizontal direction).

The orientation of the storage part 50 at the point in time when the last picked-up image 500 is taken is detected by the inclination detection part 57 (see FIG. 3) at the point in time when imaging is performed (in other words, at the point in time when the update stop instruction is received) and stored in the storage part 55. Further, the orientation of the portable terminal 50 at this point in time is also detected by the inclination detection part 57 (FIG. 3). Then, for example, the orientation of the portable terminal 50 at the point in time when the last picked-up image 500 is taken is the "vertical" orientation (upward) and the orientation of the portable terminal 50 at this point in time is the "horizontal" orientation (leftward), the portable terminal 50 displays thereon the picked-up image 500 (502) in a state where the orientation of the picked-up image 500 (502) is rotated clockwise by 90 degrees (so that the picked-up image 500 is in an upward direction). With this operation, when the picked-up image is displayed as a still image, it is possible to appropriately change the orientation of the display of the picked-up image 500 in accordance with the orientation of the portable terminal 50 at this point in time.

In the above-described operation, the two-dimensional bar code image 262 having the display command for the character input part as its code information is generated in the MFP 10, and the operation screen 200 including the bar code image 262 is displayed on the touch panel 25 of the MFP 10. Then, the portable terminal 50 generates the picked-up image 500 obtained by imaging the operation screen 200 displayed on the touch panel 25 and displays (superimposedly displays) an image obtained by synthesizing the character input part (keyboard) 273 and the picked-up image 500 on the basis of the display command included in the bar code image 262 in the picked-up image 500, on the touch panel 75. Therefore, the user can perform a character input by using the character input part 273 displayed on the touch panel 75 of the portable terminal 50. In other words, the user can perform the character input without using the operation screen 200 displayed on the touch panel 25 of the MFP 10. For this reason, it is possible to suppress a possibility that an input content (character input content) in the character input process may be peeped by another user. Especially, since the user can draw the portable terminal 50 to himself, it is possible to more reliably suppress the possibility that the input content may be peeped by another user. Further, more especially, in the still image mode (in more detail, after imaging the still image), the user can draw the portable terminal 50 more closer (for example, to the front of his eyes) without consideration of the positional relation between the portable terminal 50 and the MFP 10. For this reason, it is possible to still more reliably suppress the possibility that the input content may be peeped by another user.

Further, since the character input screen using the picked-up image 500 of the operation screen 200 (displayed on the touch panel 25 of the MFP 10) is displayed on the portable terminal 50, it is not necessary to transmit the image data of the operation screen 200 to the portable terminal 50 in order to display the character input screen on the portable terminal 50. Therefore, it is possible to avoid a decrease in the operability with transmission and reception of image data.

Furthermore, by performing the above-described coordinate conversion process (see Step S34), the position and size of the character input parts display frame 261 which is the display target area of the character input part (keyboard) 273 are specified, and the display position and display size of the character input part 273 are determined. Therefore, the character input part 273 can be displayed at an appropriate position with an appropriate size in the picked-up image 500.

The bar code image 262 has the display position information of the character input fields 231 and 232 in the operation screen 200, and the position determination part 65 of the portable terminal 50 specifies the respective corresponding positions in the picked-up image 500 to the character input fields 231 and 232 by performing the coordinate conversion process on the display position information included in the bar code image 262. Then, on the touch panel 75 of the portable terminal 50, the characters inputted by using the character input part 273 are displayed at the respective corresponding positions. Therefore, the characters inputted by the character input part 273 can be appropriately displayed at the position of the character input field 231 (or 232) displayed in the picked-up image 500 as a subject.

Especially, it is easier to recognize the position and the like of the bar code image 262 in the picked-up image 500 than to recognize the positions and the like of the other elements, and it is therefore possible to relatively easily specify the position of each part in the picked-up image 500 by using the recognized position and the like of the bar code image 262.

More especially, since the aspect ratio and the like are taken into the consideration as shown in Eq. (1), it is possible to favorably correct the display position of the character input part 273 and the display positions of the character input fields 231 and 232, and the like, in consideration of the distortion in the aspect ratio in the picked-up image due to the difference between the inclination of the touch panel 25 and that of the portable terminal 50 (in short, that the touch panel 25 and the portable terminal 50 are not in parallel).

Further, in the high security mode, the display control part 13 of the MFP 10 does not display the software keyboard (character input part) 251 which is displayed in the normal mode but displays the bar code image 262 instead of the software keyboard 251. With this operation, since the character input is not performed by using the software keyboard 251, it is possible to avoid a peep of the content inputted by using the software keyboard 251 by another user. It is therefore possible to more reliably suppress the possibility that the input content in the character input process (user authentication information input process) may be peeped by another user.

Furthermore, since the touch panel 75 of the portable terminal 50 deletes the bar code image 262 in the picked-up image 500 which is generated by the image pickup part 52 in the high security mode, from the picked-up image 500, and displays thereon the character input part 273 instead of the bar code image 262, it is possible to prevent the character input part 273 from being made hard to see by the bar code image 262.

2. Variations

Thus, though the preferred embodiment of the present invention has been described, the present invention is not limited to the above-described one.

For example, in the above-described preferred embodiment, though the case has been described where the keyboard 273 is stored in the storage part 55 of the portable terminal 50 in advance at the installation of the remote operation program, or the like, (in other words, the case where the keyboard 273 is incorporated in the remote operation program), the present invention is not limited to this case. A keyboard or the like of the Input Method Editor (referred to simply as "IMF") which is installed separately from the remote operation program in the portable terminal 50 may be called up as the above-described keyboard 273.

Further, in the above-described preferred embodiment, though the keyboard is mainly used as the character input part 273, the character input part 273 is not limited to the keyboard but a handwritten character input pad or the like may be used as the character input part 273.

Furthermore, in the above-described preferred embodiment, though the case has been described where the image obtained by superimposing only the keyboard 273 on the picked-up image is displayed in Step S36, the present invention is not limited to this case. For example, in Step S36, the label characters of the buttons 211 and 212 as well as the keyboard 273 may be superimposed on the picked-up image, to be displayed.

Specifically, as described above, the operation screen 200 has the information name display fields (buttons) 211 and 212. Further, the bar code image 262 further has the name information (information of information type name ("User ID" and "Password")) and the respective display position information ((X3, Y3), (X4, Y4)) of the information name display fields. In Step S33, these display position information and the like are extracted from the bar code image 262 and acquired. Furthermore, in Step S34, the position determination part 65 of the portable terminal 50 specifies the respective corresponding positions in the picked-up image 500 to the information name display fields 211 and 212 by performing the above-described coordinate conversion process (the coordinate conversion result from Eq. (1)) on the respective display position information of the information name display fields 211 and 212 in the operation screen 200 (the information extracted from the bar code image 262).

Then, in Step S36, on the touch panel 75 of the portable terminal 50, the character strings (names) on the name information (the information extracted from the bar code image 262) are superimposedly displayed (synthetically displayed) at the respective corresponding positions specified in Step S34.

Herein, the display position and the like of each of the superimposedly displayed characters in the picked-up image 500 are determined as follows. Specifically, by performing the above-described coordinate conversion process (see Step S34 and Eq. (1)) on the information acquired in Steps S31 to S33 (in more detail, the display position information of the information name display fields (211 and the like) included in the bar code image 262), the positions (corresponding positions) and sizes of the information name display fields (211 and the like) in the picked-up image 500 are specified. Then, on the touch panel 75 of the portable terminal 50, the characters (character string) on the name information (of the information name display field) extracted from the bar code image 262 are superimposed on the information name display fields (the information name display fields which are present as subjects in the picked-up image 500) (211 and the like) in the picked-up image 500 on the basis of the information and the like of the corresponding positions of the information name display fields (211 and the like), to be displayed (synthetically displayed). For example, the character string "User ID" indicating the information type name of the character input field 231 is superimposed on the information name display field 211 in the picked-up image 500, to be displayed.

With this operation, since the characters (character string) on the name information are written as a character image in the picked-up image 500, the characters (character string) are sharply displayed. Further, since the respective positions and sizes of the information name display fields 211 and 212 are relatively easily specified on the basis of the above-described coordinate conversion process (see Step S34) using the recognition result of the position and the like of the bar code image 262, the information name display fields 211 and 212 can be relatively easily displayed at appropriate positions in the picked-up image 500.

Furthermore, it is preferable that the characters (in other words, the images representing characters (character images)) superimposed on the information name display fields (211 and the like) in the picked-up image 500 should be displayed as characters (character images) having a nontransparent background. It is thereby possible to prevent the characters from being made hard to see due to overlap of the character images to be superimposedly displayed and the characters (characters as subjects) which are originally included in the picked-up image 500.

As the characters (character string) to be superimposedly displayed on the information name display fields (211 and the like), for example, the label character string (name information) (e.g., "User ID") embedded in the bar code image 262 may be used without any change.

Alternatively, a converted name which is a translation result obtained by translating a name (character string) (e.g., "User ID") embedded in the bar code image 262 as "name information of the information name display field" into a different language (e.g., German, French, or the like) may be superimposed on the information name display field (211 or the like) in the picked-up image 500, to be displayed. It is thereby possible to easily display the character input screen in accordance with any one of various languages on the portable terminal 50 without changing the display content on the MFP 10 (the touch panel 25).

Further, in the above-described preferred embodiment, though the case has been described where the login screen (the input screen for authentication information) is mainly shown as the operation screen requiring high security, the present invention is not limited to this case. For example, the above idea may be applied to a case where a registration screen (destination registration screen or the like) for address list (address information), a specification screen for destination information of facsimile communication, and/or the like are/is used as the operation screen requiring high security.

Further, in the above-described preferred embodiment, though the case has been described where the bar code image 262 is deleted from the picked-up image 500, the present invention is not limited to this case but the bar code image 262 may be continuously displayed without being deleted from the picked-up image 500. In a case, however, where the bar code image 262 is displayed in the display target area for the keyboard 273, it is preferable that the bar code image 262 should be deleted from the picked-up image 500 from the viewpoint of ensuring visibility of the keyboard 273.

In the above-described preferred embodiment, though the case has been described where a single bar code image is displayed in the operation screen 200 on the touch panel 25, the present invention is not limited to this case but a plurality of bar code images may be displayed in the operation screen 200 on the touch panel 25.

Figure 22:
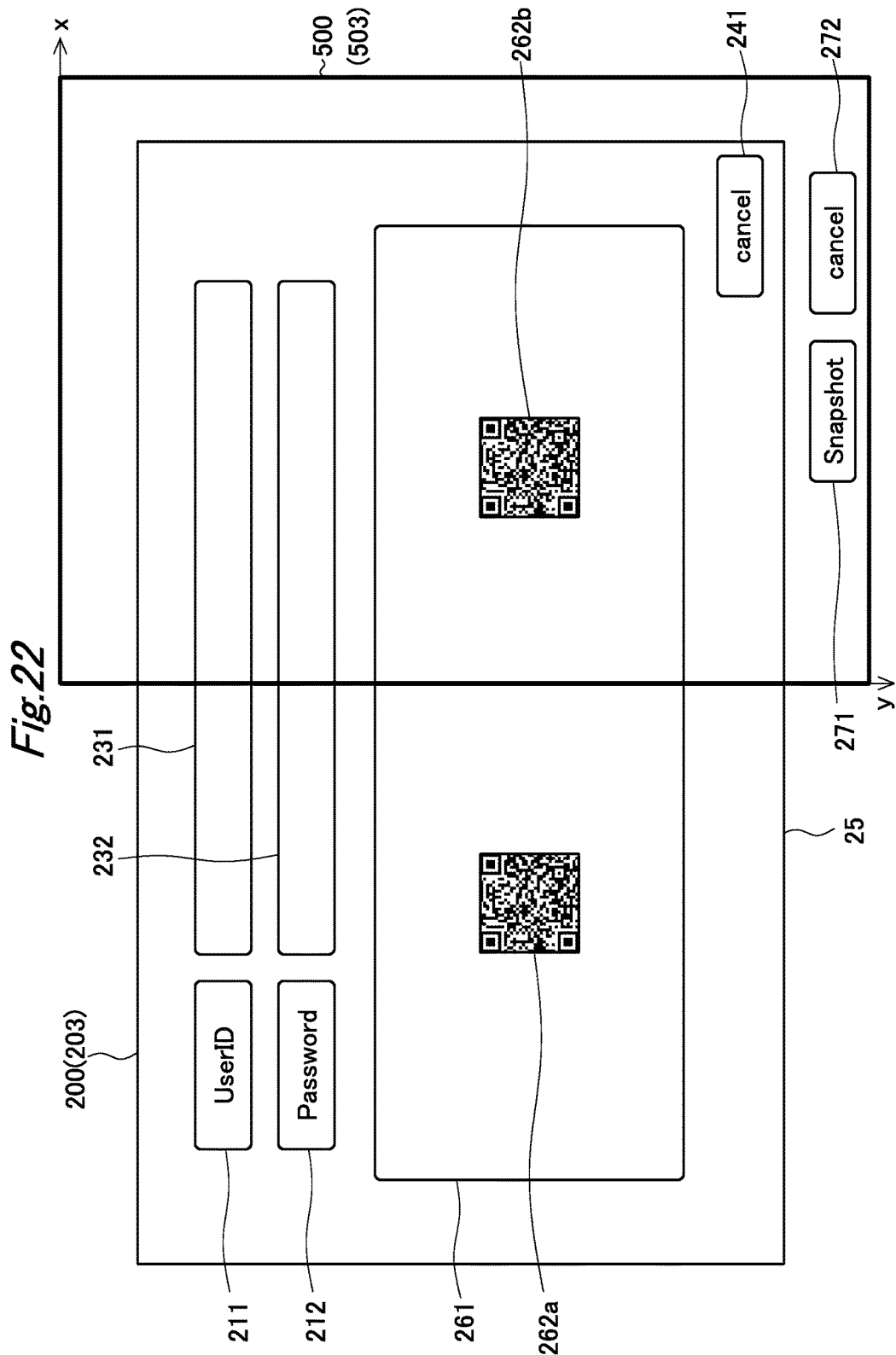
FIG. 22 is a view showing an operation screen and the like in accordance with a variation.

FIG. 22 is a view showing such a variation. In an operation screen 200 (203) shown in FIG. 22, two bar code images 262 (262*a*, 262*b*) are displayed in the character input parts display frame 261. The bar code images 262*a* and 262*b* include respective information on individually different positions (and sizes) of these bar code images as respective code information (of these bar code images).

The portable terminal 50 displays the picked-up image 500 obtained by imaging such an operation screen 200 on the touch panel 75.

Figure 23:
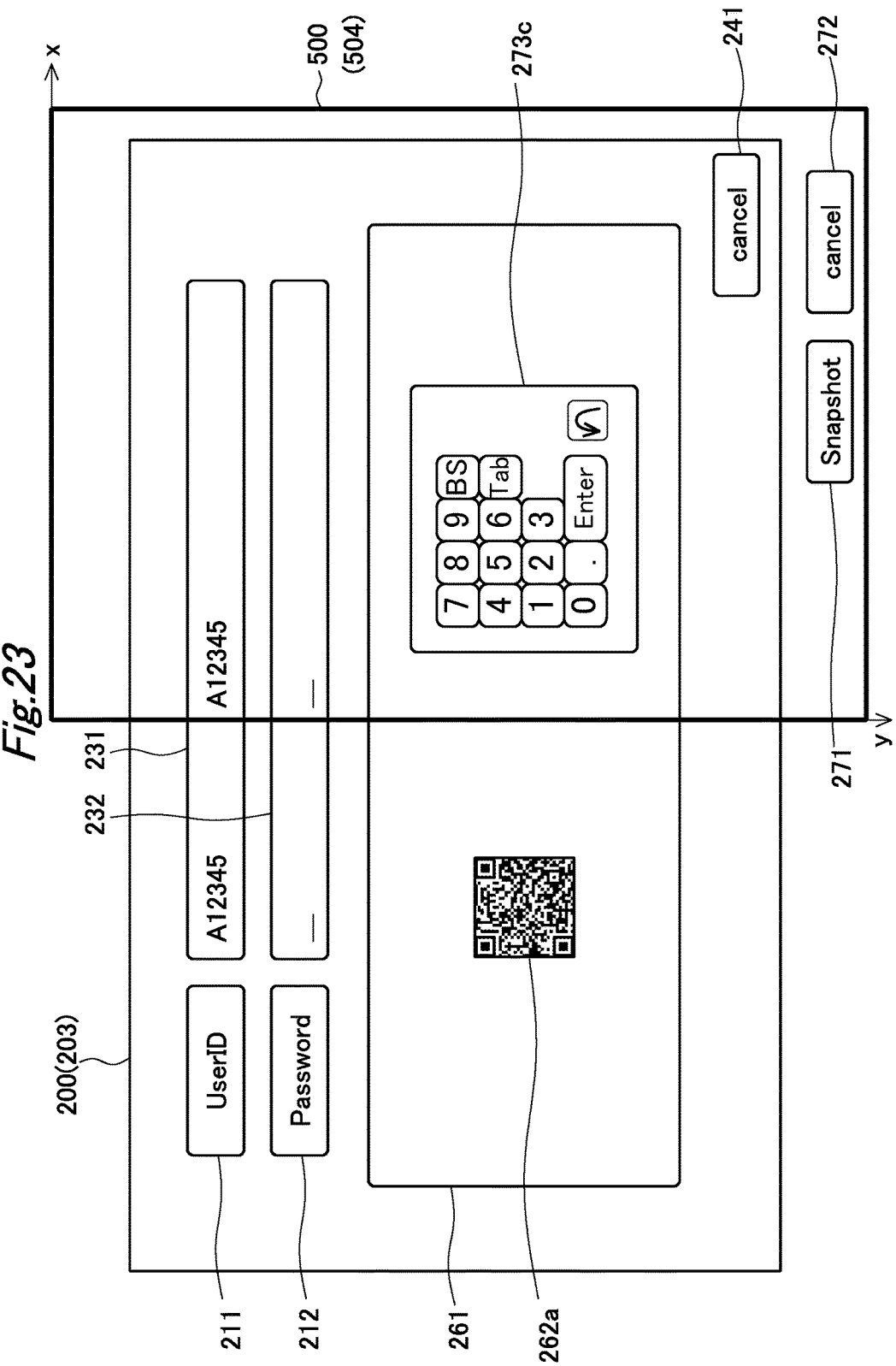
FIG. 23 is a view showing a character input screen and the like in accordance with the variation.

Then, for example, the portable terminal 50 images the touch panel 25 (the operation screen 200) including the bar code image 262*b* on the right side of FIG. 22 and generates a picked-up image (picked-up image including the bar code image 262*b*) 500 (503) thereof. In this case, on the basis of the information on the position and size of the bar code image 262*b* itself included in the bar code image 262*b*, the same coordinate conversion process as shown in the above-described preferred embodiment, and the like, are performed. Then, as shown in FIG. 23, the character input part (keyboard image) 273 is so displayed as to be included within the character input parts display frame 261 of the picked-up image 500 (504). After that, by using the character input part 273, the portable terminal 50 performs a character input operation. Further, as shown in FIG. 23, the inputted character string (e.g., "A12345") is superimposedly displayed at the position of the character input field 231 in the picked-up image 500.

Alternatively, the portable terminal 50 images the touch panel 25 (the operation screen 200) including the bar code image 262*a* on the left side of FIG. 22 and generates a picked-up image (picked-up image including the bar code image 262*a*) 500 thereof. In this case, on the basis of the information on the position and size of the bar code image 262*a* itself included in the bar code image 262*a*, the same coordinate conversion process as shown in the above-described preferred embodiment, and the like, are performed, and the character input part (keyboard image) 273 is so displayed as to be included within the character input parts display frame 261 of the picked-up image 500. After that, by using the character input part 273, the portable terminal 50 performs a character input operation.

More alternatively, a picked-up image 500 including both the two bar code images 262*a* and 262*b* shown in FIG. 22 may be generated. Further, in this case, for example, by averaging the results of the two coordinate conversion processes using the two bar code images 262*a* and 262*b*, respectively, the coordinate conversion process on each position may be performed. Specifically, by performing an averaging process of the result of the coordinate conversion process on the basis of the information on the position and size of the bar code image 262*a* itself embedded in the bar code image 262*a* and that of the coordinate conversion process on the basis of the information on the position and size of the bar code image 262*b* itself embedded in the bar code image 262*b*, the coordinate conversion process on each position may be performed.

While the invention has been shown and described in detail, the foregoing description is in all aspects illustrative and not restrictive. It is therefore understood that numerous modifications and variations can be devised without departing from the scope of the invention.

What is claimed is:

1. An image forming system, comprising:
an image forming apparatus; and
a portable terminal for displaying a character input screen to receive a character input from a user,
said image forming apparatus having a hardware processor configured to generate a code image having a display command to display a character input in said character input screen as code information thereof; and
a display for displaying an operation screen including said code image, and
said portable terminal having a hardware processor configured to:
generate a picked-up image which is obtained by picking up an image of said operation screen of said image forming apparatus, which picked-up image includes the code image;
extract said display command to display said character input from said code image included in said picked-up image; and
display a screen which is obtained by replacing the code image included in said picked-up image with said character input screen based on said display command; and
said portable terminal having a transmitter configured to transmit a character input content inputted in said character input screen to said image forming apparatus.

2. The image forming system according to claim 1, wherein said code image has
information on position and size of said code image in said operation screen; and
information on position and size of a display area of said character input in said operation screen,
said hardware processor of the portable terminal is further configured to:
acquire first information which is information on position and size of said code image in said picked-up image by an image recognition process for said picked-up image, acquire second information which is information on position and size of said code image in said operation screen, and acquire third information which is information on position and size of said display area of said character input in said operation screen by an analysis process for said code image; and
specify a corresponding position in said picked-up image to said display area of said character input by performing a coordinate conversion process on said third information based on said first information and said second information and determine a display position of said character input in said picked-up image based on said corresponding position, and
display said character input at said display position.

3. The image forming system according to claim 2, wherein
said code image further includes display position information of a character input field which is an input field in said operation screen, and
said hardware processor of said portable terminal is further configured to:
acquire said display position information of said character input field in said operation screen by said analysis process for said code image,
specify a corresponding position in said picked-up image to said character input field by performing said coordinate conversion process on said display position information, and
display an image which is obtained by synthesizing said input character and a character input field of said picked-up image based on information of said corresponding position to said character input field.

4. The image forming system according to claim 2, wherein
first identification information which is a check ID on a link target is embedded in said code image,
said hardware processor of said portable terminal is further configured to extract said check ID from said code image by analyzing said code image in said picked-up image,
said transmitter of said portable terminal transmits a link establishment request with said check ID extracted from said code image to said image forming apparatus; and
said hardware processor of the image forming apparatus is further configured to permit establishment of a communication link between said image forming apparatus and said portable terminal on condition that coidentity between second identification information which is a check ID received from said portable terminal and said first identification information embedded in said code image is confirmed.

5. The image forming system according to claim 3, wherein
said operation screen has an information name display field indicating a type name of information to be inputted into said character input field,
said code image further has name information of said type name and display position information of said information name display field in said operation screen, and
said hardware processor of said portable terminal is further configured to:
acquire said name information of said type name and said display position information of said information name display field in said operation screen by said analysis process for said code image,
specify a corresponding position in said picked-up image to said information name display field by performing said coordinate conversion process on said display position information of said information name display field, and
display a character string on said name information at said corresponding position in said picked-up image to said information name display field.

6. The image forming system according to claim 5, wherein
said hardware processor of said portable terminal is further configured to display said character string included in said code image as said name information superimposedly in said information name display field.

7. The image forming system according to claim 5, wherein
said hardware processor of said portable terminal is further configured to display a converted name which is a translation result obtained by translating a name included in said name information into a different language, superimposedly in said information name display field.

8. The image forming system according to claim 1, wherein
said image forming apparatus has a plurality of modes including a first mode and a second mode which ensures security higher than that of said first mode, and
said hardware processor of said image forming apparatus, in said second mode, is configured to not display a first character input which is displayed in said first mode in said operation screen but is configured to display said code image in said operation screen, instead of said first character input.

9. The image forming system according to claim 8, wherein
said hardware processor of said portable terminal is further configured to delete said code image in said picked-up image which is generated by said hardware processor of the portable terminal in said second mode from said picked-up image and display a second character input which is said character input, instead of said code image.

10. The image forming system according to claim 1, wherein
said hardware processor of said portable terminal is further configured to:
update said picked-up image at a predetermined time interval, and
sequentially display said picked-up image which is updated at said predetermined time interval.

11. The image forming system according to claim 10, wherein
said hardware processor of said portable terminal is further configured to:
stop an update of said picked-up image and display an image which is obtained by synthesizing said picked-up image displayed like a still image, and
receive a character input when an update stop instruction is received from a user.

12. The image forming system according to claim 11, wherein
said hardware processor of said portable terminal is further configured to change an orientation of display of said picked-up image when an orientation of said portable terminal at the point in time when said update stop instruction is received and that of said portable terminal at this point in time are different from each other.

13. An image forming apparatus capable of communicating with a portable terminal, comprising:
a hardware processor configured to generate a code image having a display command to display a character input in a character input screen displayed on said portable terminal, as code information thereof;
a display device configured to display an operation screen including said code image; and a receiver configured to receive from said portable terminal a character input content inputted in said character input screen displayed on said portable terminal, wherein the character input screen is displayed on said portable terminal by picking up an image of said operation screen with said portable terminal and replacing the code image with the character input screen.

14. A non-transitory computer-readable recording medium for recording therein a computer program to be executed by a computer embedded in an image forming apparatus capable of communicating with a portable terminal, to cause said computer to perform the steps of:

a) generating a code image having a display command to display a character input in a character input screen displayed on said portable terminal, as code information thereof;

b) displaying an operation screen including said code image; and c) receiving from said portable terminal a character input content inputted in said character input screen displayed on said portable terminal, wherein the character input screen is displayed on said portable terminal by picking up an image of said operation screen with said portable terminal and replacing the code image with the character input screen.

15. A portable terminal capable of communicating with an image forming apparatus, comprising:

a hardware processor configured to:
generate a picked-up image by picking up an image of an operation screen displayed on said image forming apparatus;
extract a display command of a character input from a code image included in said picked-up image; and
display a screen which is obtained by replacing the coded image included in said picked-up image with a character input screen based on said display command; and a transmitter configured to transmit a character input content inputted in said character input screen to said image forming apparatus.

16. A non-transitory computer-readable recording medium for recording therein a computer program to be executed by a computer embedded in a portable terminal capable of communicating with an image forming apparatus, to cause said computer to perform the steps of:

a) generating a picked-up image by picking up an image of an operation screen displayed on said image forming apparatus;

b) extracting a display command of a character input from a code image included in said picked-up image;

c) displaying a screen which is obtained by replacing the coded image included in said picked-up image with a character input screen based on said display command; and d) transmitting a character input content inputted in said character input screen to said image forming apparatus.

* * * * *